(12) United States Patent
Ginestet et al.

(10) Patent No.: US 12,448,800 B2
(45) Date of Patent: Oct. 21, 2025

(54) BUTTERFLY FAN INLET AND CHAMBER EXHAUST VALVE CONTROLLERS FOR WAVE MAKING SYSTEM

(71) Applicant: WHITEWATER WEST INDUSTRIES LTD., Richmond (CA)

(72) Inventors: Clement Ginestet, Paris (FR); Axel Terradillos, Munich (DE)

(73) Assignee: WHITEWATER WEST INDUSTRIES LTD., Richmond (CA)

( * ) Notice: Subject to any disclaimer, the term of this patent is extended or adjusted under 35 U.S.C. 154(b) by 133 days.

(21) Appl. No.: 18/490,604

(22) Filed: Oct. 19, 2023

(65) Prior Publication Data

US 2024/0133198 A1   Apr. 25, 2024
US 2024/0229489 A9   Jul. 11, 2024

Related U.S. Application Data

(60) Provisional application No. 63/380,230, filed on Oct. 19, 2022.

(51) Int. Cl.
*E04H 4/00* (2006.01)
*F16K 1/22* (2006.01)

(52) U.S. Cl.
CPC ........... *E04H 4/0006* (2013.01); *F16K 1/223* (2013.01)

(58) Field of Classification Search
CPC .............................. E04H 4/0006; F16K 1/223
USPC .......................................... 4/488, 491, 541.1
See application file for complete search history.

(56) References Cited

U.S. PATENT DOCUMENTS

| 4,979,244 A * | 12/1990 | Bastenhof | ............. E04H 4/0006 4/491 |
|---|---|---|---|
| 8,434,966 B1 | 5/2013 | McFarland | |
| 9,103,133 B2 | 8/2015 | McFarland | |
| 9,279,263 B2 | 3/2016 | McFarland | |
| 10,145,135 B2 | 12/2018 | McFarland et al. | |

(Continued)

FOREIGN PATENT DOCUMENTS

| CN | 113152947 A | 7/2021 |
|---|---|---|
| EP | 2199494 A1 | 6/2010 |

(Continued)

OTHER PUBLICATIONS

Notice of Allowance for U.S. Appl. No. 18/604,290, dated Aug. 21, 2024, 08 Pages.

(Continued)

*Primary Examiner* — Lori L Baker
(74) *Attorney, Agent, or Firm* — Buchalter, a Professional Corporation

(57) ABSTRACT

A pool wave generator having a pool area and a plurality of chambers for generating a wave in the pool area. Exemplary embodiments include using exhaust valves in each chamber to control the performance of fans. Measuring the power consumed by the fans in real time allows determination of the amount of air to be evacuated from the pneumatic system (and thus an opening angle of the exhaust valves) so that the fans operate at maximum efficiency and with less instability. In an exemplary embodiment, a valve mounted on the fan inlet allows the incoming air flow to be controlled, thereby allow the motors to continue rotating at a given speed with little or no energy consumption when the valve is partially or fully closed.

7 Claims, 26 Drawing Sheets

(56) References Cited

U.S. PATENT DOCUMENTS

| | | |
|---|---|---|
| 10,280,640 B2 | 5/2019 | McFarland et al. |
| 10,526,806 B2 | 1/2020 | McFarland |
| 10,738,492 B1 * | 8/2020 | McFarland ........... E04H 4/0006 |
| 12,110,706 B2 | 10/2024 | Ginestet et al. |
| 2022/0290455 A1 | 9/2022 | Ginestet et al. |
| 2024/0240477 A1 | 7/2024 | Ginestet et al. |

FOREIGN PATENT DOCUMENTS

| | | |
|---|---|---|
| WO | 2021055482 A1 | 3/2021 |
| WO | 2022178622 A1 | 9/2022 |
| WO | 2024082059 A1 | 4/2024 |

OTHER PUBLICATIONS

International Search Report and Written Opinion for International Application No. PCT/CA2023/051390, dated Dec. 4, 2023, 09 pages.

* cited by examiner

BUTTERFLY FAN INLET AND CHAMBER EXHAUST VALVE CONTROLLERS FOR WAVE MAKING SYSTEM

CROSS-REFERENCE TO RELATED APPLICATIONS

This application claims benefit of U.S. provisional patent application No. 63/380,230, filed Oct. 19, 2022. This application is related to U.S. patent application Ser. No. 17/652,680, filed Feb. 25, 2022.

BACKGROUND

Water attractions have brought fun to different people from different geographic locations for many generations. The water attraction permits different geographic areas to have access to simulated experiences from other geographic areas. For example, a wave pool may approximate an experience at a beach.

Different water attractions may be used to approximate natural environments to permit users to experience sports and activities from these other environments. For example, sheet wave rides simulate a surfing or boogie boarding experience that permits a rider, with their body or a thin board, to ride upon a sheet flow of water that is contoured by an underlying ride surface. The sheet wave ride does not provide a true surfing experience, as the sheet flow does not permit wave breaking or the use of an actual surfboard.

Deep wave surfing systems are provided that attempt to create a more accurate approximation of the surfing experience in the natural environment. U.S. Pat. Nos. 8,434,966; 9,103,133; 9,279,263; 10,145,135; 10,280,640; and 10,526,806 disclose deep wave surfing simulators, each of which is incorporated by reference in their entirety herein.

Deep wave rides pose a unique challenge to manage the vast amount of water that is used in the ride. For example, currents and eddy currents may form that can undermine the wave formation. Managing the air and the water into and out of the chambers is also problematic. Air in the chamber can act like a spring and the momentum of the water leaving and returning to the chamber may create unwanted forces and oscillations and other movement on the water. These forces may, in turn, create unwanted wave effects, turbulence, and other adverse features within the generated wave.

A further difficulty exists in that when the pressure in the plenum becomes too high for the fan to blow in, the air starts to escape from the plenum through the fan in the opposite direction. As a result, one or more fans may blow backwards and make the system less efficient due to the venting air, creating instabilities. This may also result in overall system inefficiencies, fan inefficiencies, fan damage, fan vibration, overheating, and energy loss as the fans oscillate between intake and venting. When fans are running in reverse flow the system is losing air, resulting in negative efficiency, which is worse than when fans are not running. In other words, reverse flow means that efficiency is negative as power is consumed to bleed air.

SUMMARY

A pool wave generator is disclosed having a pool area and a plurality of chambers for generating a wave in the pool area. The plurality of chambers may be used to retain or release water into the pool to create a desired wave.

Exemplary embodiments described herein may include unique pool and chamber configurations for managing fluid flow, including the water and air within the chambers, to influence desired patterns of waves and control or minimize undesirable wave effects. Exemplary embodiments of the system and methods described herein may be used to control a variety of features of the wave, for example, the water height in the chamber, which may be used to dampen residual waves after a wave is generated in the pool. Such exemplary configurations may be useful in creating and maintaining desired wave formations and in permitting repeated wave formations either in a series along a length of a pool or in time a desired time interface, such as in the length of time between waves. Exemplary embodiments may also be used to control and define tailored waves that can have individual features that are controllable or programmable.

Although described herein in terms of a deep wave pool having specific characteristics, including the pool shape, chambers to release water, and troughs to control return of water into the pool, such embodiments are exemplary only. Exemplary embodiments of the chamber and control system and methods for generating a wave can be used in different water environments. For example, embodiments described herein may be used to generate waves for surfing, or merely for a wave pool. Exemplary embodiments may be used for other aquatic rides in which water is retained and released in a controlled manner.

In various embodiment, the invention may include one or more of the following aspects:

Using exhaust valve and intake valve with position-controlled actuators wherein the valves actuations are independent from each other, do not interfere with each other and/or adapt to each other;

Using an exhaust valve attached to the caisson to accomplish two independent functions: exhausting air from the chamber to create a wave and when the chamber is not used for wave generation use exhaust valve to vent air from the chamber to ultimately vent air from the plenum to control fan operation points.

Providing exhaust valves from the chamber in a manner does not require additional vent valves on the plenum to vent the plenum, whereby using the exhaust valves of the chamber offers a much more responsive response (more in number) and a more uniform response.

Monitoring the power drawn by the fan instead of pressure in the chamber, whereby efficiency is improved, no additional pressure sensors in the plenum are required, and a much finer control is offered than monitoring the pressure.

Monitoring individual fans for individual surge detection via the power consumption, thereby providing an advantage over monitoring common pressure in the plenum Using a inlet valve or an IVC with a position controlled actuator.

Dynamically changing the performance curve of the fan where the valve opening angle or position changes depending on the air demand Decreasing peak power consumption by allowing the fans to be ramped up at different times during start up.

In one embodiment, the invention may comprise a pool area; at least one chamber on one side of the pool area for releasing water into the pool area to generate a wave in the pool area; a plenum in fluid communication with the at least one chamber; at least one fan positioned in fluid communication with the plenum; a valve controller; an intake valve positioned between the plenum and the chamber capable of being selectively opened by a position-controlled actuator at different angles to allow air to enter the chamber from the plenum at a controlled rate; an exhaust valve capable of being selectively opened at different angles, and positioned at a wall of the chamber such that air can be vented out of the chamber through the exhaust valve, wherein the position of the exhaust valve is independent of the position of the intake valve; a first and second sensor in communication with the valve controller; wherein the first sensor monitors fan power consumption and the second sensor monitors water level in the chamber, the first and second sensor operating independently of each other; and wherein the degree to which the exhaust valve is opened is determined by the valve controller based on power consumption information for the at least one fan.

In one embodiment, the invention provides improved efficiency and accuracy in fan operation by computing an actual fan curve based on actual air density (using temperature and humidity sensors in the mechanical room); determining a surge power point and best efficiency power point; picking a power point between the surge and best efficiency point; measuring the error between the actual power and the power target; calculating the total air flow required (if any) to evacuate in order to arrive at the power target, including by using chamber pressure and/or temperature sensor to calculate this value; computing the required opening valve angle using the valve characteristics and the number of valves available that are not being used for wave generation; measuring the actual power; and reverting back to the first step and repeating the process.

DETAILED DESCRIPTION

The following detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. It should be understood that the drawings are diagrammatic and schematic representations of exemplary embodiments of the invention, and are not limiting of the present invention nor are they necessarily drawn to scale. Like numbers are intended to refer to like features throughout the drawings.

Although embodiments of the invention may be described and illustrated herein in terms of a pool wave generator having unique and novel features, it should be understood that embodiments of this invention do not require or necessitate the inclusion of each of the features, unless noted.

Figure 1A:
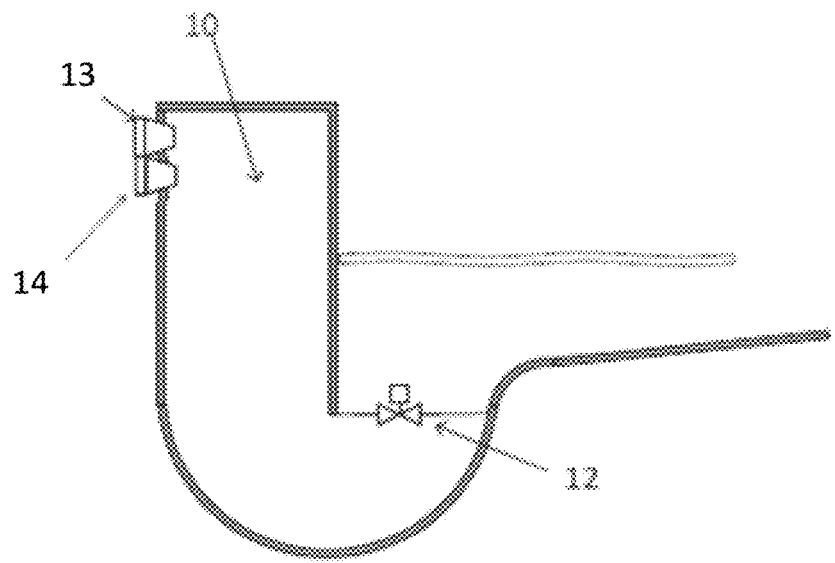
FIGS. 1A-1C illustrate an exemplary wave generating chamber and associated control thereof to generate a wave in the dep wave pool described herein.
Figure 1B:
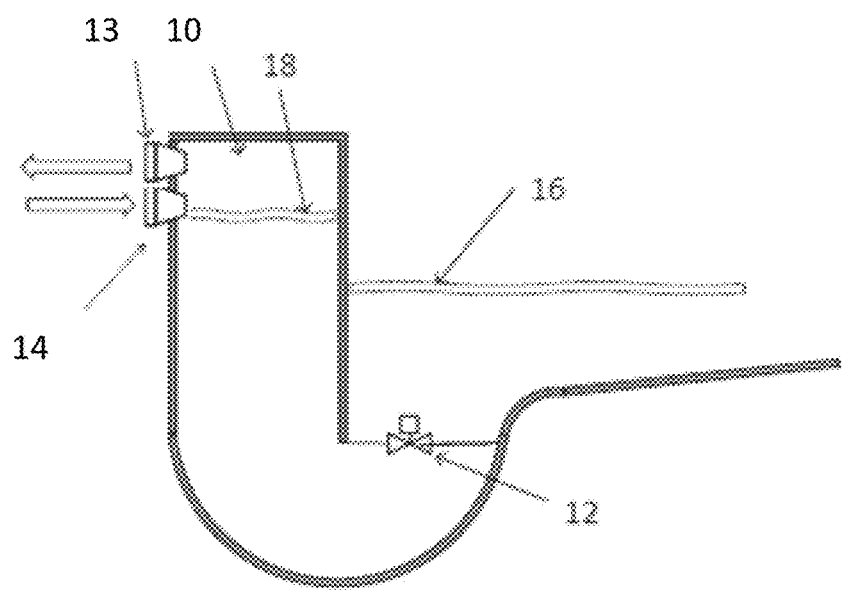
Figure 1C:
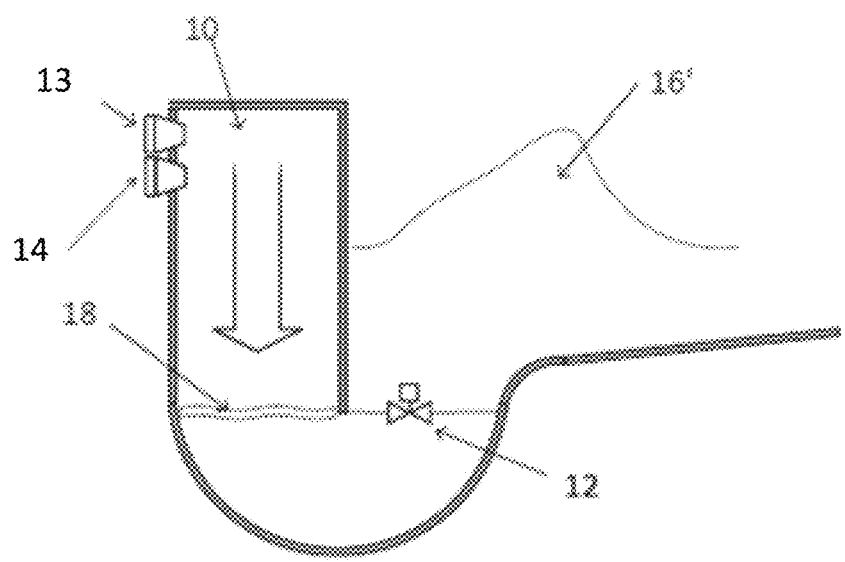

FIGS. 1A-1C illustrate an exemplary wave generating chamber and associated control thereof to generate a wave in the wave pool described herein. The chamber 10 may be configured to retain water at a chamber water level 18 that when released into the pool, a pool water level 16 is increased creating a wave 16' that propagates away from the chamber 10, across the pool. The chamber may include one or more valves 12, 13, 14 for controlling the retention and release of the water within the chamber. In an exemplary embodiment, a first valve 12 may control the water flow into and out of the chamber 10. In an exemplary embodiment, a second valve or a plurality of valves may control air or fluid flow into and out of the chamber 10. A shown in FIGS. 1A-1C, an exemplary ingress valve 14 may be used to introduce pressurized gas into the chamber. An exemplary exhaust valve 13 may be used to remove gas from the chamber by venting gas or applying negative pressure to the chamber.

In an exemplary embodiment, the wave generating system may include a control system. The control system may include a sensor within the chamber. The sensor may be comprised of one or more sensors. In an exemplary embodiment, the sensor may include a water height sensor, pressure sensor, or temperature sensor. In an exemplary embodiment, the water height sensor may be used to determine or approximate the water height within the chamber. In another embodiment, the pressure sensor may be used to determine or approximate the water height within the chamber. Other control sensors may be incorporated, such as within the plenum, at the vent, at the ingress valves or ingress valve actuator, at the pressure fans or at fan motors, or at the control panel controlling the fans motor. Any combination of the sensors may be configured as an input into the control system to assist in the operation or control of the chamber. In an exemplary embodiment, the control system is configured to receive an input from one or more sensors and control one or more valves in response to the received sensor input.

In an exemplary embodiment, the control system may comprise actuators for setting a position of one or both of the valves 13, 14 to transition the valves from fully open to fully closed or any intermediate position therebetween. For example, if fully closed is considered zero degrees, and fully open is considered ninety degrees, the valve may be positioned at any angle from 0 to 90 degrees. In an exemplary embodiment, one or both of the ingress and exhaust valves are equipped with a position controller so that the one or more valves may be opened to a position anywhere from fully open to fully closed, and anywhere in between.

In an exemplary embodiment, the water heights in the chamber may be measured with one or more sensors within the chamber. In an exemplary embodiment, a sensor is positioned at the top of the chamber. In an exemplary embodiment, the sensor is configured to provide an input into the control system so that the control system may determine a height of the water within the chamber. The control system may be configured to control the vent or ingress valves to control a desired water height within the chamber.

In an exemplary embodiment, the chamber includes a pressure sensor. The control system may be configured to control the vent and ingress valves to maintain a desired pressure within the chamber. In an exemplary embodiment, the pressure sensor within the chamber may be in fluid communication with the chamber.

Exemplary embodiments described herein may include a control system that is able to set a position of one or more valves to fully open and fully closed. The control system may be configured to control a corresponding wave height by controlling variable frequency drives (VFD) to achieve a desired pressure.

Exemplary embodiments described herein may include a control system that is able to set a position of one or more valves from anywhere from fully open to fully closed, and any intermediate position there between. Exemplary embodiments comprise positioning one or more valves in an intermediate position between fully open and fully closed. The control system may be configured to control a corresponding wave height by height set points and not VFD frequency.

As seen in FIG. 1A, the system may have been released so that no water is in the chamber 10 or the water level 18 in the chamber is at a low level (such as illustrated in FIG. 1C). The second valve 13 may be opened to purge air from the chamber. The chamber 10 may be configured to evacuate air from the chamber 10, such that the chamber is negatively pressurized. The second valve 13 may also be open, such that the chamber 10 is at neutral pressure and the air in the chamber is permitted to vent as the chamber is filled with water. The first valve 12 is opened and the rush of water into the chamber elevates the water level in the chamber.

As seen in FIG. 1B, the first valve 12 is closed to retain the chamber water level 18 at a height greater than the pool water level 16. The chamber 10 may then be filled with a pressurized gas to impose additional pressure on the water within the chamber. The second valve 13 is then closed and the first valve 12 is then opened.

As seen in FIG. 1C, the pressurized air in the chamber 10 pushes the water level 18 within the chamber, which in turn surges water out of the chamber to generate a wave 16' that propagates across the pool. The first valve 12 may be closed while the air in the chamber is vented, such as through the second valve 13. The first valve 12 may be closed to limit the amount of water let back into the chamber to minimize disruption to the formed wave 16'. The first valve 12 may also remain open to permit the water to return to the chamber and be closed as discussed with respect to FIG. 1B.

In an exemplary embodiment, the control system may be configured to control a third valve 14 for providing air into the chamber and a second valve 13 for removing air from the chamber. The system may also include one or more sensors used as an input into the control system for determining a height of the water within the chamber or a pressure of the air within the chamber or in a part of the system in fluid communication with the chamber. In an exemplary embodiment, the control system comprises a feedback loop such that the second valve 13 and third valve 14 are positioned to control a water height within the chamber and/or maintain a desired pressure within the chamber.

Exemplary embodiments may include a user interface in which the control system may be programmed. The user interface may be configured to display information to the user and may receive inputs from the user. The user interface may be used to provide settings for the control systems such as in determining a desired relationship between the valve position and the sensor inputs. In an exemplary embodiment, the user interface is configured to receive desired water height profile information describing a desired wave characteristic, such as water height profile in the chambers, from a user, in which the system thereafter is configured to determine control parameters in order to achieve the desired wave characteristic. Exemplary embodiments of the control system may therefore be used to control wave height during wave generation. Exemplary embodiments of the control system may be used to control wave shapes, wave characteristics, etc. The system may be used to create unique and fully tailored waves as each chamber can be fully actuated to create a combined effect with the water to configure almost any wave.

In an exemplary embodiment, the system is configured to cycle through the process of releasing water from the chamber and permitting the resurgence of water into the chamber. The system may also include a delay after any number of cycles to permit the water in the pool to settle and reduce turbulence that could affect wave generation.

In the exemplary embodiment provided, three valves are illustrated—a first valve 12 for water control and a second and third valves 13, 14 for gas control. Any combination of valves may be used and are within the scope of the instant disclosure. For example, multiple gas valves may be used to vent the chamber, inject pressurized gas, etc., and multiple fluid valves may be used to emit or retain the water within the chamber. The order and cycle of the valves as described herein is exemplary only. Any number of different ways may be used to release the wave using valves, gates, or other methods. The valves may be opened and closed in different ways. For example, the system may use a purge system to remove gas from the chamber before resurgence of water to elevate the water level returning to the chamber. For example, the system may not use a pressurized gas system for expelling the water into the pool. For example, single direction valves may be used such that valves do not necessitate individual actuation to open and close. The valves of each chamber may be controlled individually or as a sequence within a larger operation of the entire pool system.

Exemplary embodiments of the control system described herein may be used to control power consumption or to reduce the power consumption required to generate waves of the same size. The power consumption may be achieved as additional energy is not necessarily expended through dampening the residual waves created by the water oscillation within the chamber. Exemplary embodiments of the control system described herein may be used to control current generation (or reduction) within the pool. The exemplary embodiments described here may result in more efficient operation of the wave pool and also in better longevity of equipment.

In an exemplary embodiment, one or more of the valves may be actuated such that the valve can be controlled to be fully open, fully closed, or partially open. In an exemplary embodiment, the one or more valves may be mechanically, pneumatically, or otherwise actuated to permit the full positional range between open and closed. In an exemplary embodiment, the one or more valves may be mechanically, pneumatically, electrically, or otherwise actuated to permit step wise positioning of the valve within the range between fully open and fully closed. Exemplary embodiments of the chamber and control system described herein may use the intermediate positioning of the one or more valves in order to control the water displacement in the chamber. In an exemplary embodiment, the control system and method may be used to adapt wave frequency to avoid or minimize main wave conflict with residual waves. In an exemplary embodiment, the control system may include one or more parameters that can be used to customize a wave characteristic. The wave characteristic may include wave height, wave shape, wave contours, etc. Exemplary embodiments may use the combination of the valve controls, including the permissible intermediate positioning of the valves as one or more parameters for wave creation that may be used to generate more wave combinations. Exemplary embodiments of the control system described herein may reduce power consumption by approximately 10%. Exemplary embodiments of the control system described herein may lower the total installed power of an installation.

Figure 2A:
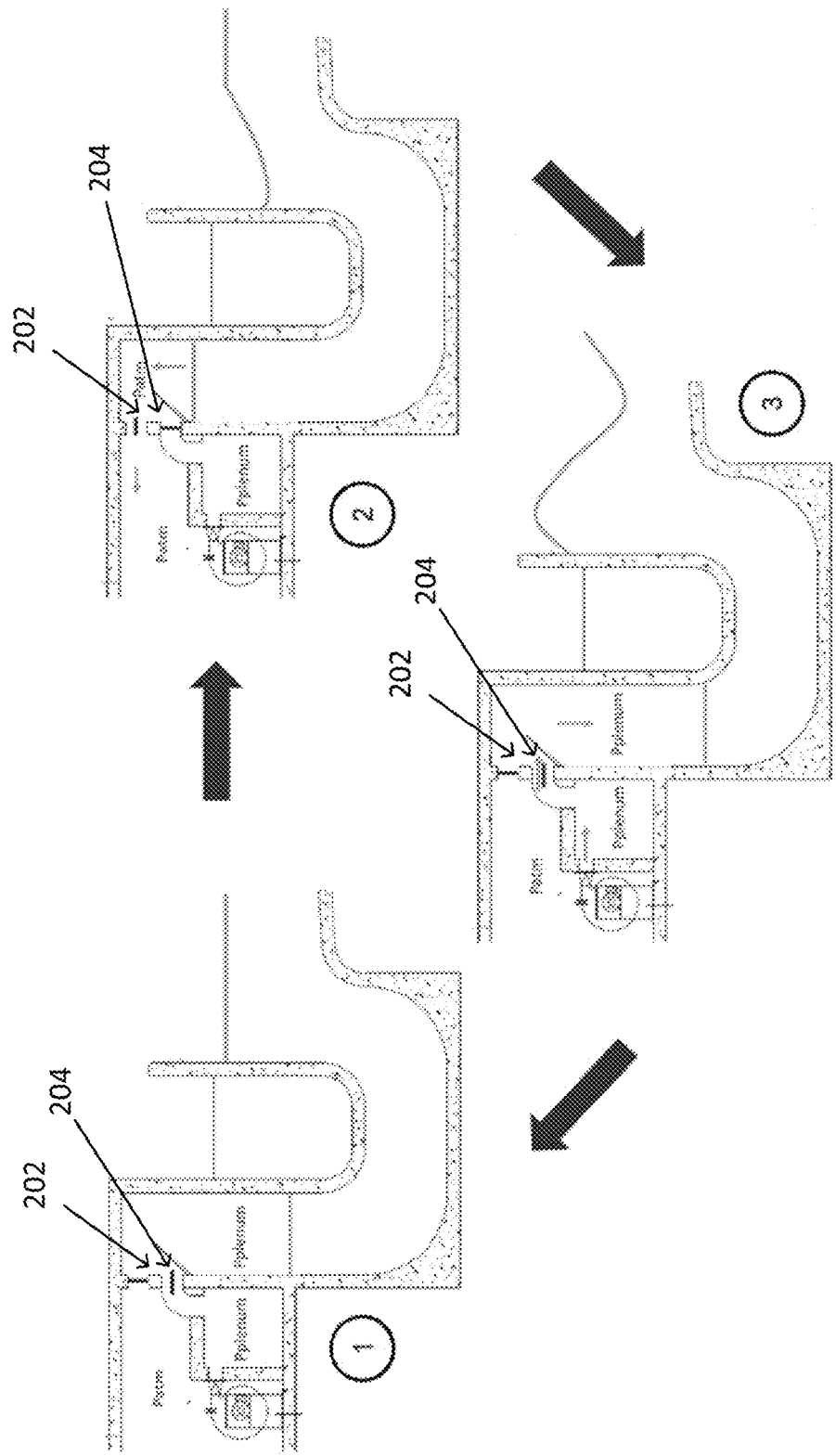
FIG. 2A illustrates an exemplary progression of a wave being generated from a wave-generating chamber.

FIG. 2A shows an exemplary progression of a wave being generated from a wave-generating chamber. The first step illustrated in FIG. 2A is when the wave chamber and wave pool is ready to be fired to produce a wave. In this initial state, the vent valve 202 is fully closed, the ingress valve 204 is fully open. The ingress valve 204 permits pressurized air in the plenum to enter the chamber and apply pressure on the water of the chamber to create a low water level, below the water level in the wave pool. At the second step illustrated in FIG. 2A, the chamber pressure is released. The vent valve 202 is fully opened, and the ingress valve 204 is fully closed. The air pressure in the chamber is therefore released, and the water in the chamber rises. The rising water in the chamber creates a void of water in the wave pool as water moves from the wave pool in to the chamber. This movement creates a local reduction in the water level height in the pool adjacent the pool near the chambers. At the third step illustrated in FIG. 2A, the chamber pressure is again increased to release the water from the chamber. As illustrated, the vent valve 202 is fully closed, while the ingress valve 204 is fully open. This permits the pressurized air to push against the water and eject the water from the chamber, through the passage, and into the wave pool. As illustrated, a wave is generated in the pool as the water is pushed from the chamber and into the pool.

When the valves are used in this configuration, such that the valves are configured to transition between fully closed and fully open states, the air within the chamber can act as a spring. As the water within the chamber reaches a maximum or minimum height, the water level may bounce as the air is compressed and released, creating an oscillating wave surface.

Figure 2B:
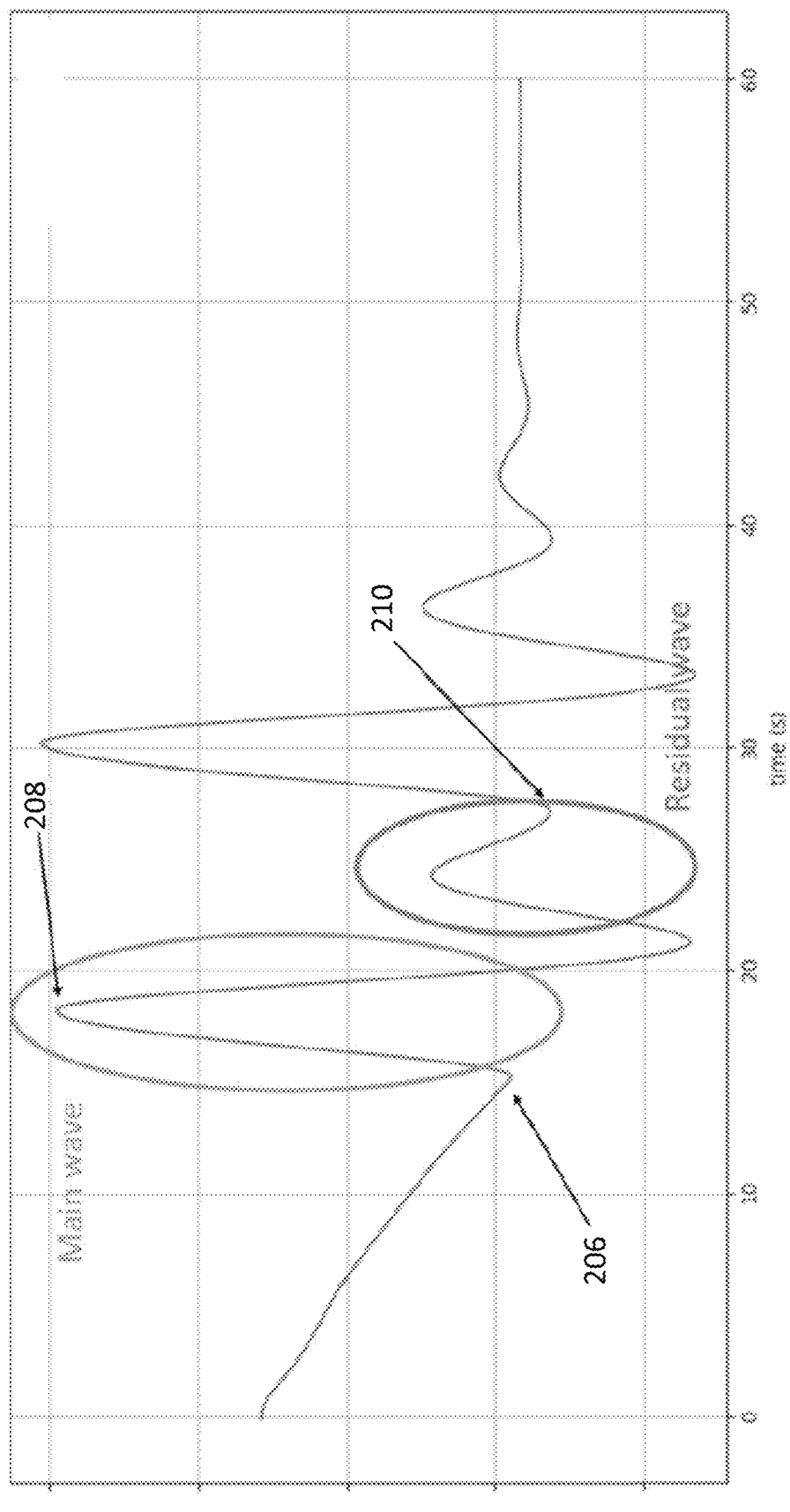
FIG. 2B illustrates an exemplary graph of the water levels within the wave pool at different times associated with the exemplary progression of the wave of FIG. 2A.

FIG. 2B illustrates an exemplary graph of the water levels within the chamber at different times associated with the exemplary progression of the wave of FIG. 2A. As is seen in the comparison with the water states from FIG. 2A, the water level in the chamber is at a lower point/resting level 206 to start. When the air is vented, the water enters the chamber and the water level increases to a maximum position 208. When the air is injected, the water exits the chamber and the water goes to a minimum. As best illustrated between the second and third states in which the chamber is transitioning between the venting state and pressurizing state and the water is taken into the chamber and then released from the chamber, the water level after reaching the minimum goes back up. However, the residual air in the chamber creates another oscillation in the chamber water height, a residual wave, before the water level returns to the original lower point/resting level position 210.

Figure 2C:
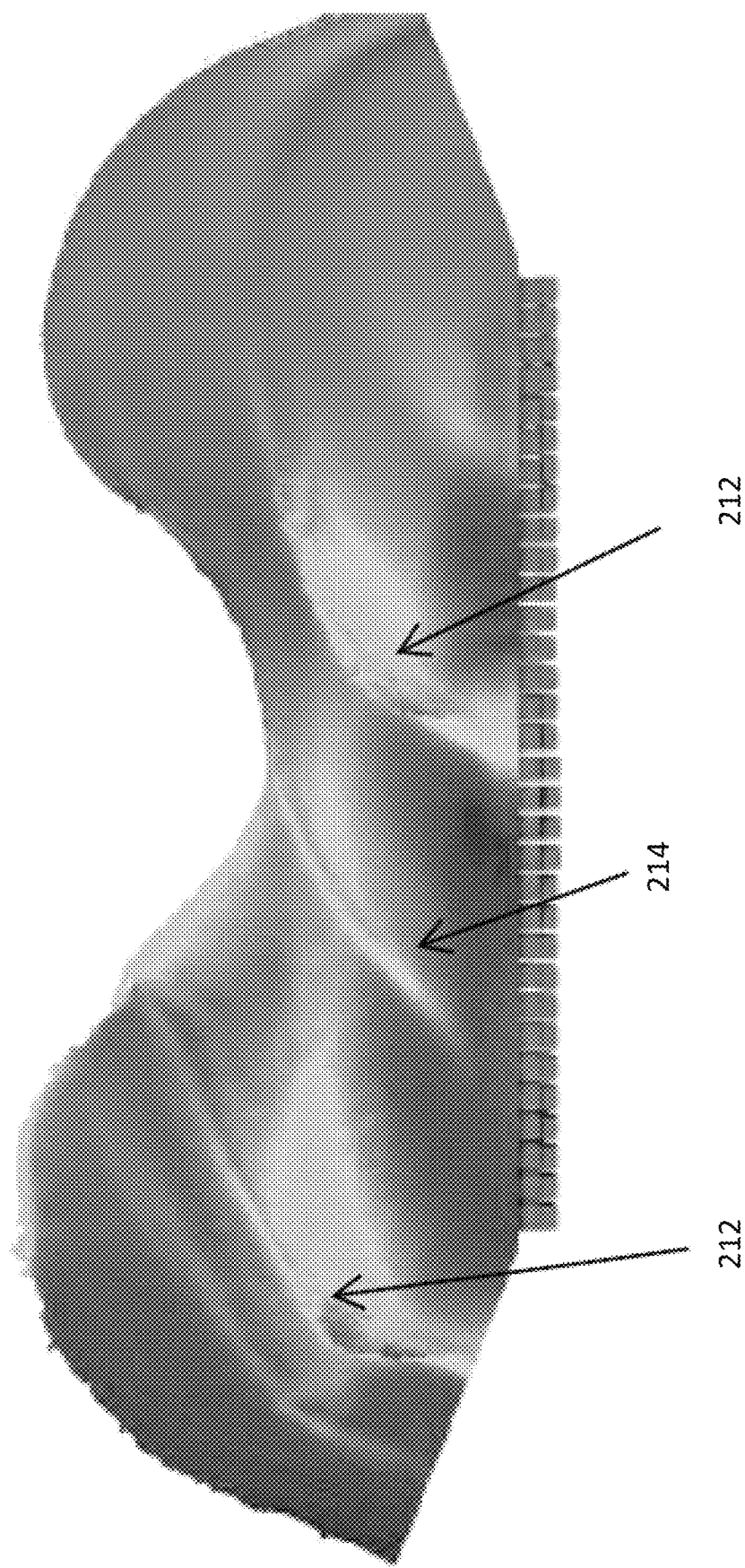
FIG. 2C illustrates an exemplary wave pattern formed in the wave pool corresponding to the wave amplitude graph of FIG. 2B.

FIG. 2C illustrates an exemplary wave pattern formed in the wave pool corresponding to the wave amplitude graph of FIG. 2B. The water height in the chamber at maximum and minimum creates the desirable rideable wave or main wave 212. However, the intermediate oscillation that may occur within the chamber can cause an interfering water action between the desired waves. The interfering water action may be like a lesser or smaller residual wave 214 between the desirable wave action.

In an exemplary embodiment, the valve system may be controlled to position the one or more valves at an intermediate position between open and closed to dampen the oscillation created within the chamber by the movement of air and water within the chamber. For example, in an exemplary embodiment, Between steps 2 and 3, instead of the vent valve transitioning from fully open to fully closed, while simultaneously transitioning the ingress valve from fully closed to fully open, the vent valve may fully close and may thereafter remain partially open or remain partially open through the transition between steps 2 to 3. Alternatively, or in addition thereto, the ingress valve may be opened by varying amounts during the transition between step 2 and 3 in order to control the influx of air into the chamber and dampen any spring action resulting from the injected air within the chamber.

Figure 3:
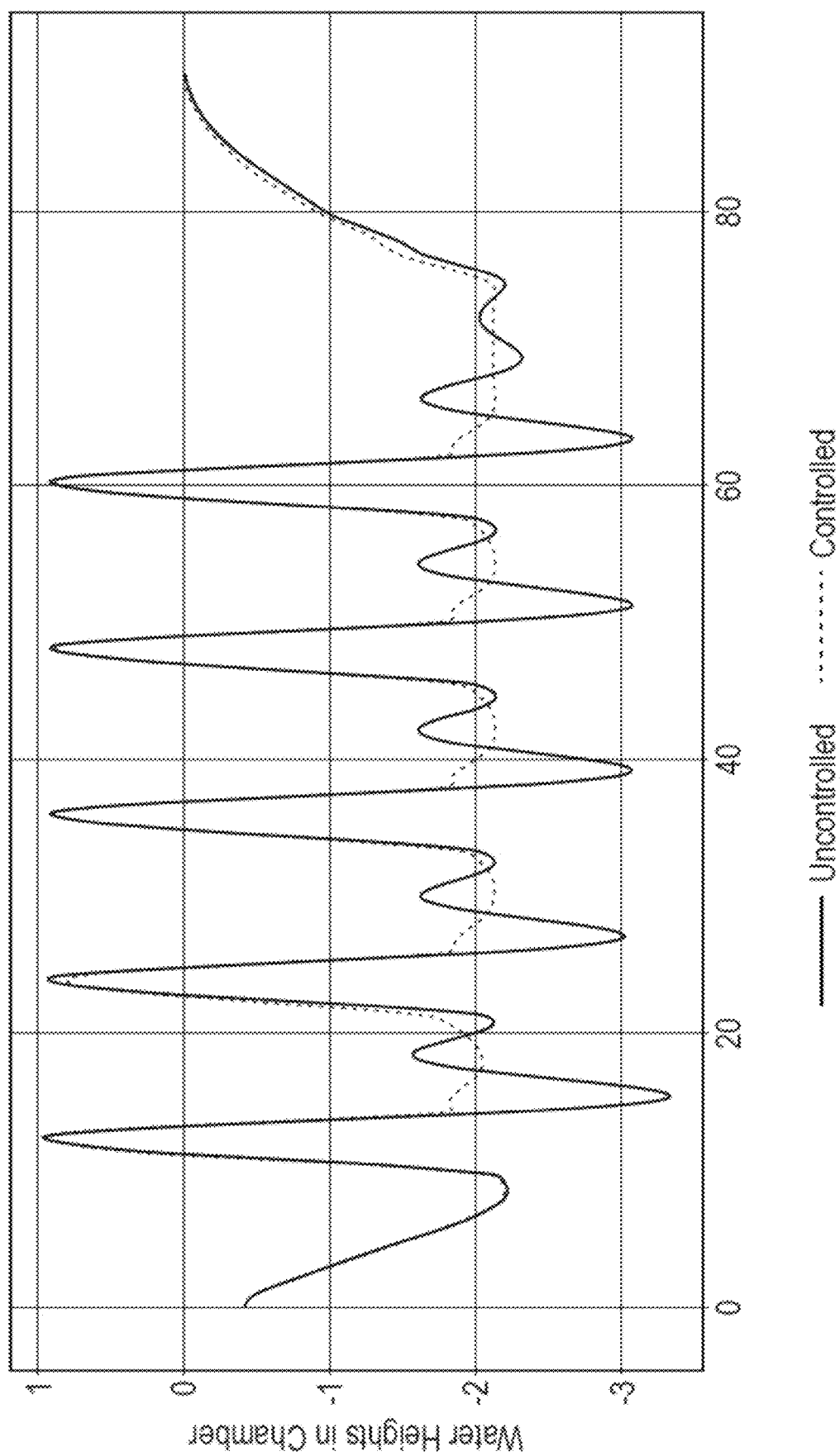
FIG. 3 illustrates an exemplary comparison of wave amplitudes on a time progression graph for water within the wave pool using the chamber and control systems according to embodiments described herein to control the desired wave patterns within the wave pool.

FIG. 3 illustrates an exemplary comparison of water amplitudes on a time progression graph for water within the chamber using the chamber and control systems according to embodiments described herein to control the desired wave patterns within the wave pool. As illustrated, the original water amplitude within the chamber progresses between a minimum and a maximum wave height with an oscillation as water re-enters the chamber. This can occur when the one or more vent or ingress valves are positioned between fully open and fully closed states. The comparison graph illustrates an exemplary embodiment in which the ingress valve is partially opened so that the water level within the chamber does not result in the same drastic minimum, but instead includes a wave profile with a defined maximum and truncated minimum, thereby minimizing the oscillation. As shown, the uncontrolled profile results in a residual wave, while the controlled profile mitigates the production of residual waves in the chambers. Tuning parameters can vary to achieve different water height profile and different performance characteristics.

Figure 4A:
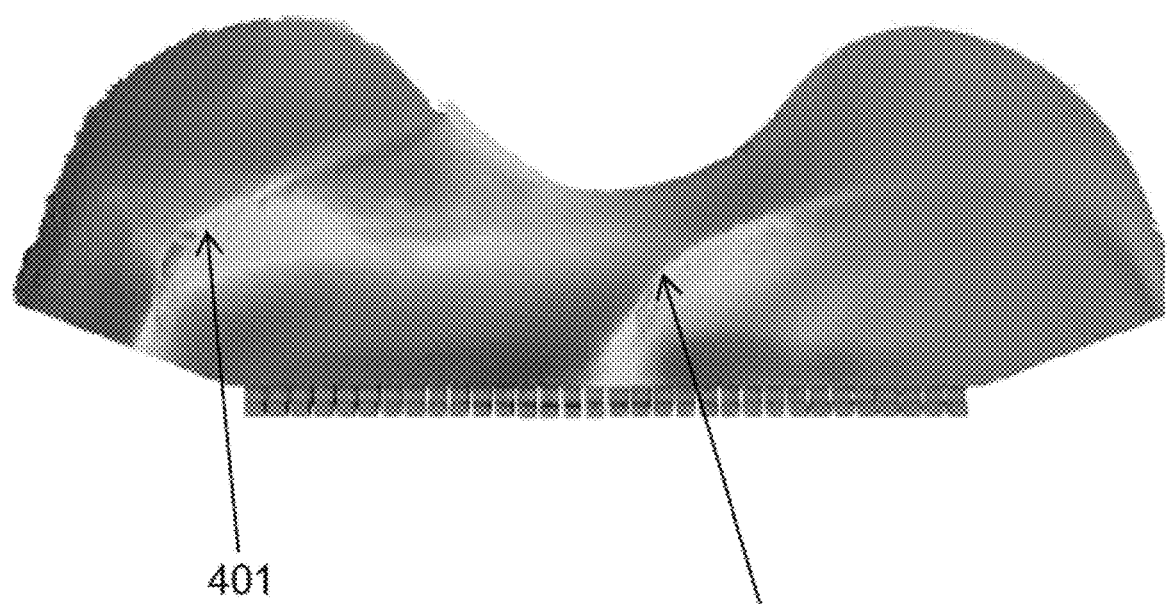
FIGS. 4A-4D illustrate exemplary comparisons of waves and currents generated within the wave pool using the chamber and control systems and methods described herein.
Figure 4B:
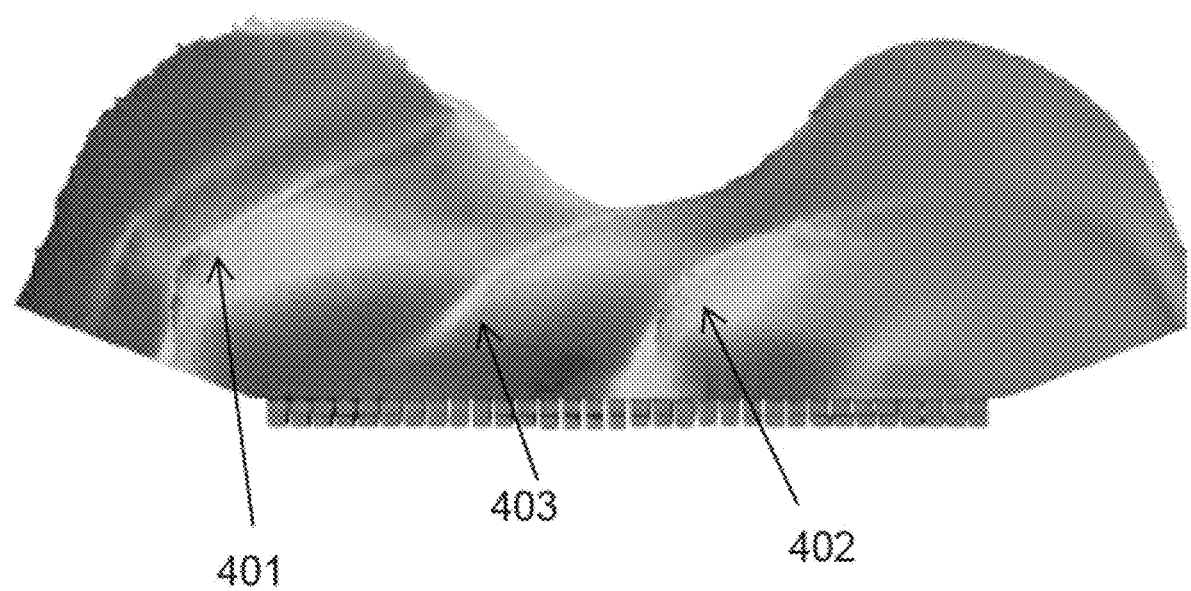

FIGS. 4A and 4B illustrate exemplary comparisons of waves generated within the wave pool using the chamber and control systems and methods described herein. FIG. 4A shows the generated waves (401, 402) using the chamber and control systems and methods described herein, resulting in mitigation of the residual wave. FIG. 4B shows waves (401, 402) generated without the benefit of the systems and methods described herein, in which the residual wave (403) occurs.

Figure 4C:
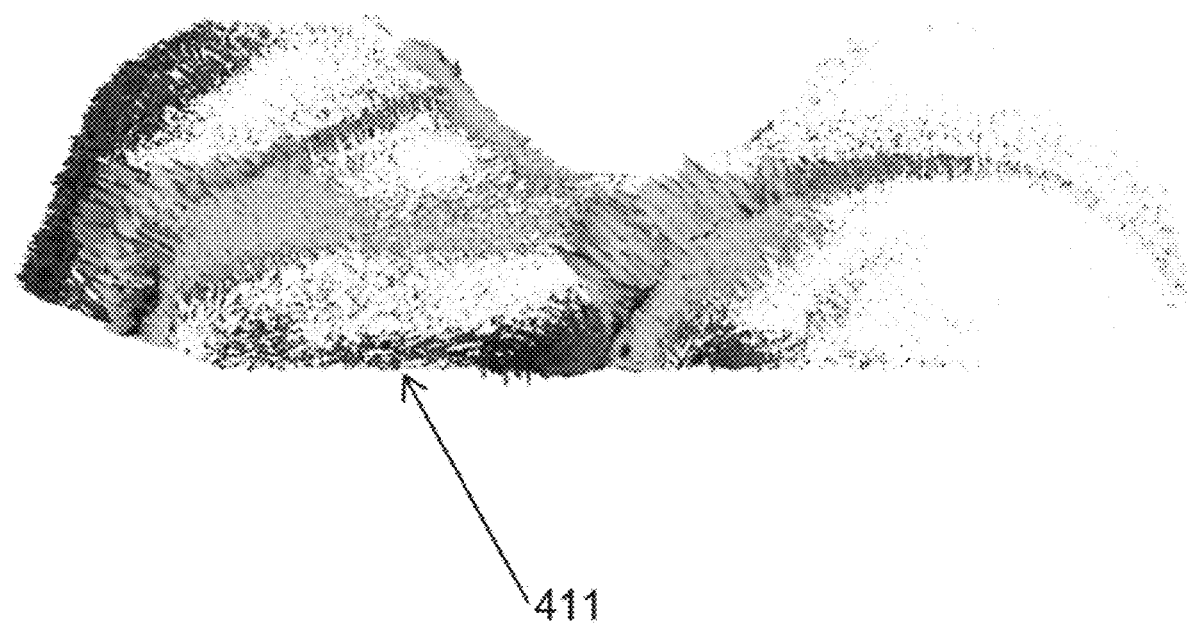
Figure 4D:
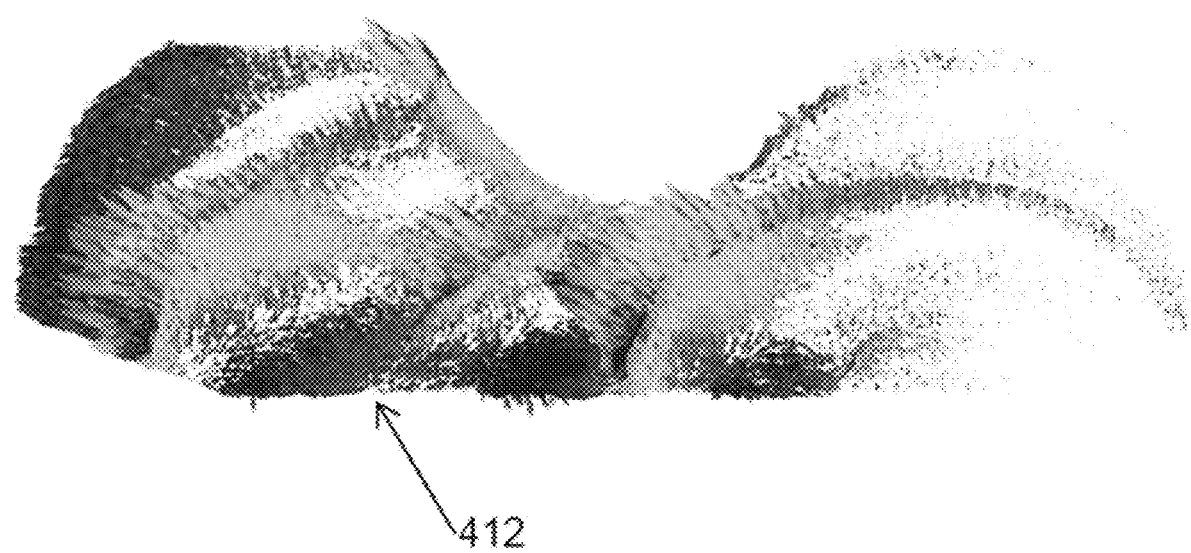

FIGS. 4C and 4D illustrate exemplary comparisons of currents (411, 412) generated within the wave pool using the chamber and control systems and methods described herein. Mitigating the residual wave significantly reduces the currents (411) in the pool allowing for a better wave quality, as depicted in FIG. 4C (with control) and resulting in a better and safer guest/surfing experience than when no control is used, as depicted by the pool including excess currents (412) in FIG. 4D.

Figure 5A:
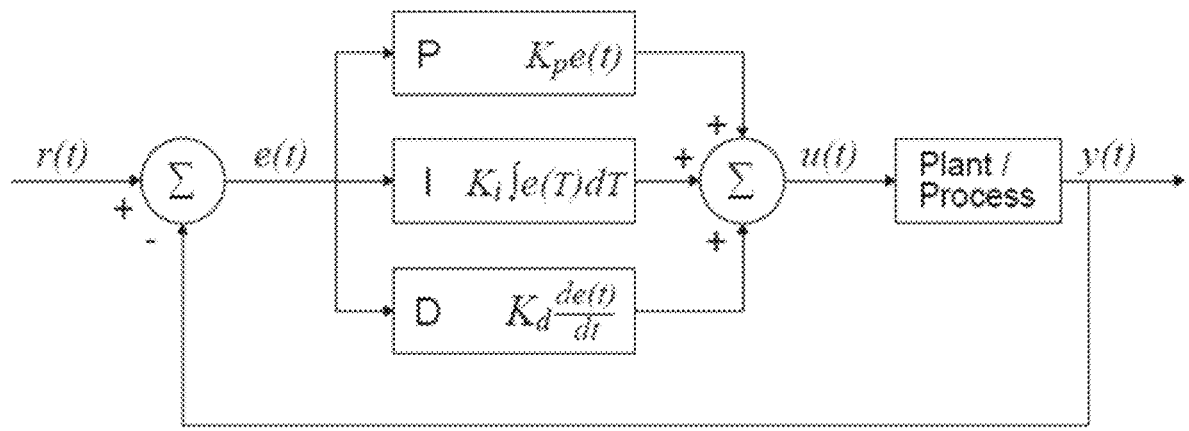
FIGS. 5A and 5B illustrate an exemplary control loops for use with the valves in the controller of the chamber for defining a desired wave shape if used with the intake valves, or for optimizing fan efficiency if used with the exhaust valves.

In an exemplary embodiment, one or more of the valves, including the exhaust valve or the injection valve may be coupled to an independent controller, such as a proportional-integral-derivative (MD) controller, proportional-integral (PI) controller, or a proportional derivative (PD) controller, to facilitate a control loop between one or more sensors of the system and the position of the one or more valves. In an exemplary embodiment, the MD controllers may follow this formula:

$$u(t) = K_p e(t) + K_i \int e(t)dt + K_p \frac{de}{dt}$$

u(t)=PID control variable
$K_p$=proportional gain
e(t)=error value
$K_i$=integral gain
de=change in error value
dt=change in time The error [e(t)] may be the difference between the current value (as given by the sensor) and the set (target) points for the water level—in the case of the intake controller. For the exhaust controller, the error is the difference between the current power drawn by the exhaust fans (as reported by sensors) and the target power. In one embodiment, the feedback control loop for the position of the exhaust valve may be based on a difference between the pressure sensor in the chamber (TRIANGLE P in FIG. 5B) (as opposed to in the plenum) and a set pressure point, and the feedback control loop for the position of the injection valve may be based on a difference between the water level height in the chamber sensor and a set height point. FIG. 5A illustrates an exemplary feedback control loop in which the target state (e.g., water level in case of the intake controller or power in case of the exhaust controller) is compared to the current state (with sensors). The error is the difference between the target state and the current state. The gains P, I and D are tuned to obtain the desired system response to an outside disturbance. Using the formula above, the PID control variable is updated. In the case of intake and exhaust controller, the computed values are the valve angles (intake and exhaust valve angles).

Figure 5B:
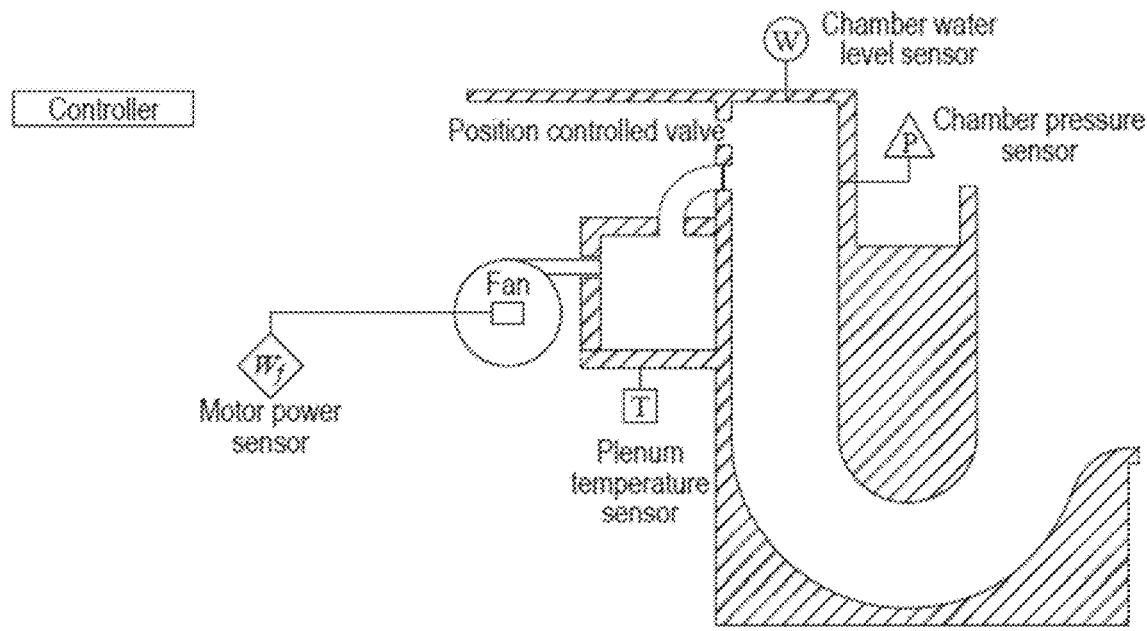

FIG. 5B illustrates an exemplary control set up for use with the injection valve. In an exemplary embodiment, as the water returns into the chamber, the water height oscillates until it reaches its final height. The water height oscillations within the chamber may be dampened by reducing the pressure given to the chamber by the plenum by reducing the opening of the intake valve. The water level may be measured by a level transmitter. The air pressure may be provided to the chamber by a valve with positional control between fully closed to fully open (0 to 100% open). In an exemplary embodiment, the intake valve opening percentage may be controlled using a PID, PI, or PD loop controller to influence the water level to the set height point, as well or alternatively to dampen the wave harmonics. The set water height point may be determined based on the wave shape or size being produced. The selection of the set height point may be tailored to influence the wave characteristics and more fully tailor a generated wave.

The invention includes a position controlled valve mounted on the chamber to control the amount of air transmitted from the plenum to the chamber. A set of sensors connected to the chamber includes sensors including, but not limited to, a water height sensor W to measure the water level in the chambers, a pressure sensor P to measure the pressure in the chamber. Other sensors, such as a temperature sensor and/or a humidity sensor to measure the temperature and humidity in the mechanical room, or a flow sensor installed on the valves to measure the speed of the flow through the valve could be used as well. A plenum, pressurized by one or more blower fans, is equipped with temperature sensors to measure the temperature in the plenum. A power sensor is connected to the motor to measure the amount of power drawn by the fan motors. Alternatively, these sensors could be replaced by amperage sensors installed on the motors electrical leads. With motors controlled by variable frequency drives (VFD), data calculated by the VFD could be used instead of sensors. In addition, one or more temperature, pressure, and humidity sensors are installed in the mechanical room to measure the air density and atmospheric pressure in the mechanical room. (Not shown in FIG. 5B.)

Figure 6:
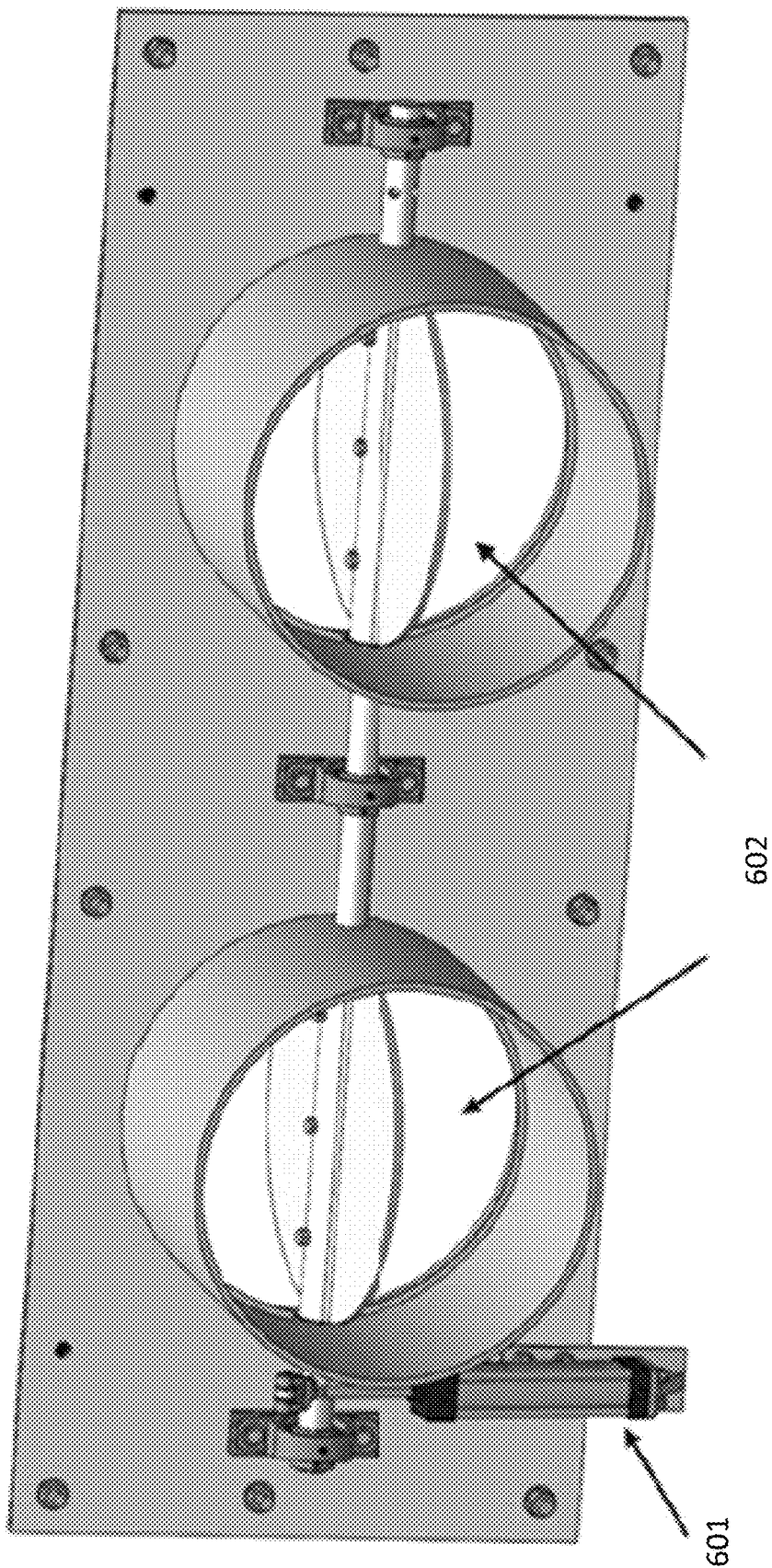
FIG. 6 illustrates an exemplary valve set.

FIG. 6 illustrates a valve set including one or more valves 602 equipped with a position-controlled actuators 601 which allows the valves to open to 0 degree (fully opened) or 90 degrees (fully closed) and anywhere in between where the position of the valves is given by a main controller signal to the actuator controller. The reaction of the actuator in response to a signal can be tuned through the actuator controller. As shown in FIG. 6, the valves 602 are fully open.

Figure 7:
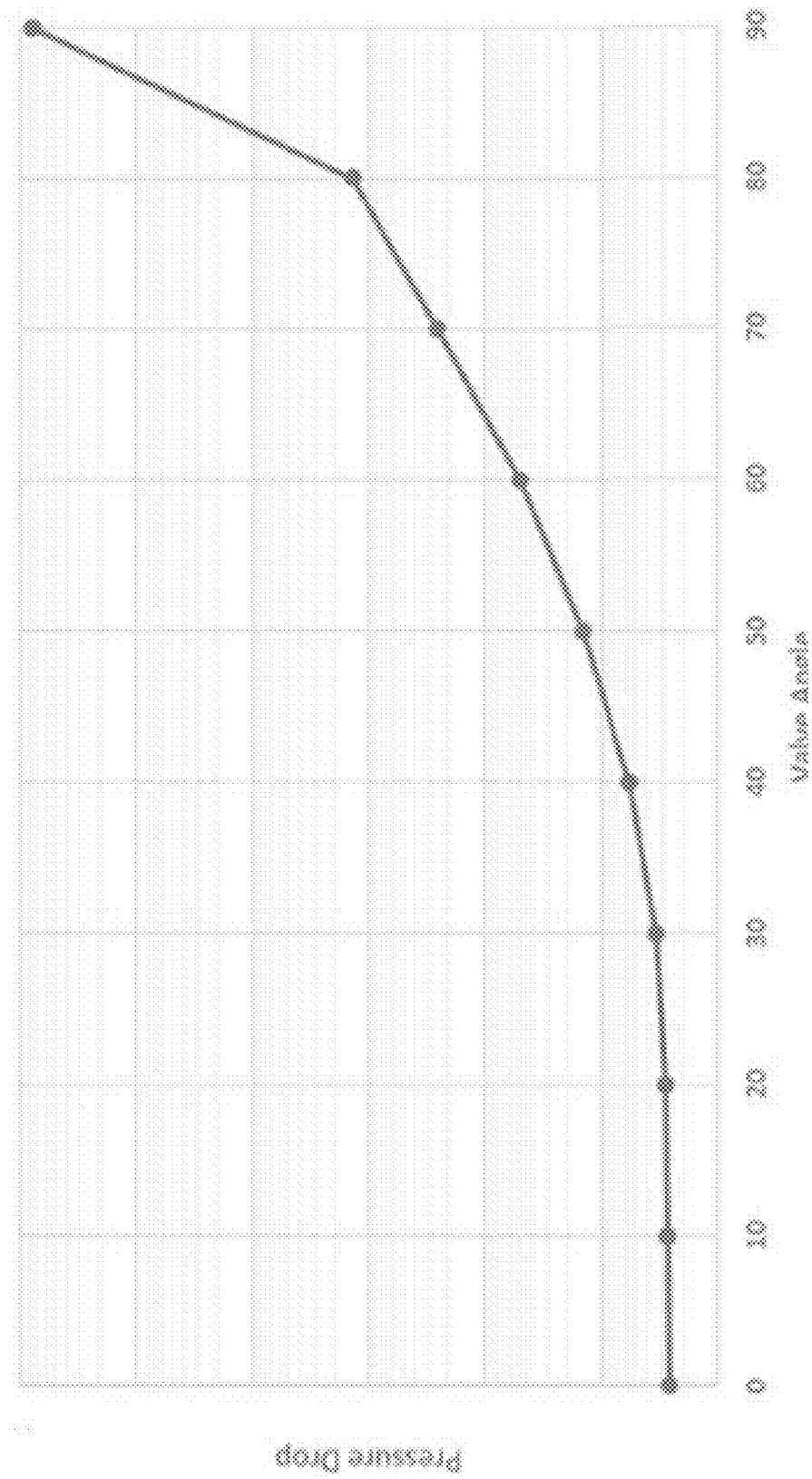
FIG. 7 illustrates typical throttle characteristics for the valves.

FIG. 7 illustrates typical throttle characteristics, showing the pressure drop through the valve or throttle increase with opening increasing. By controlling the opening of the valves, one can control the pressure drop through the valves, and the amount of air transmitted through the valves.

Figure 8:
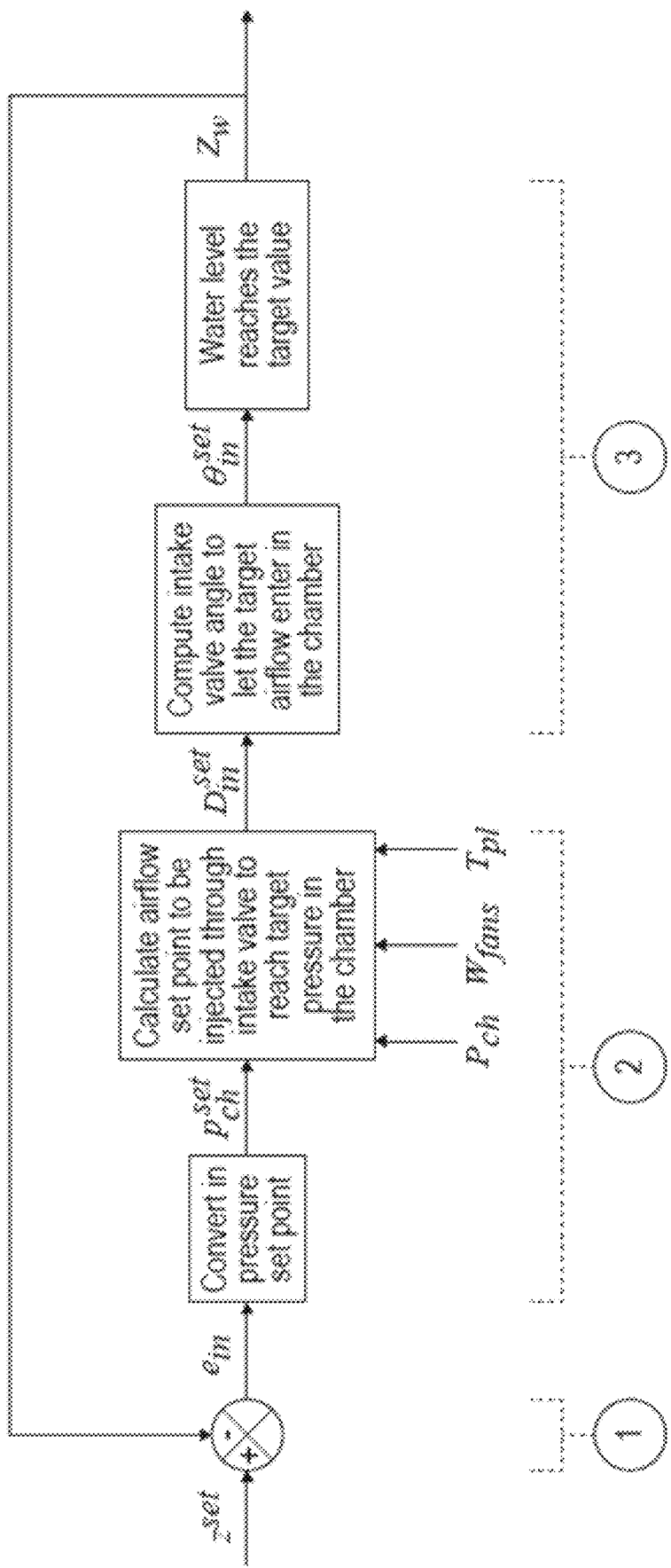
FIG. 8 is a block diagram describing the calculation of the angle of the valve required to meet the target water height.
Figure 9A:
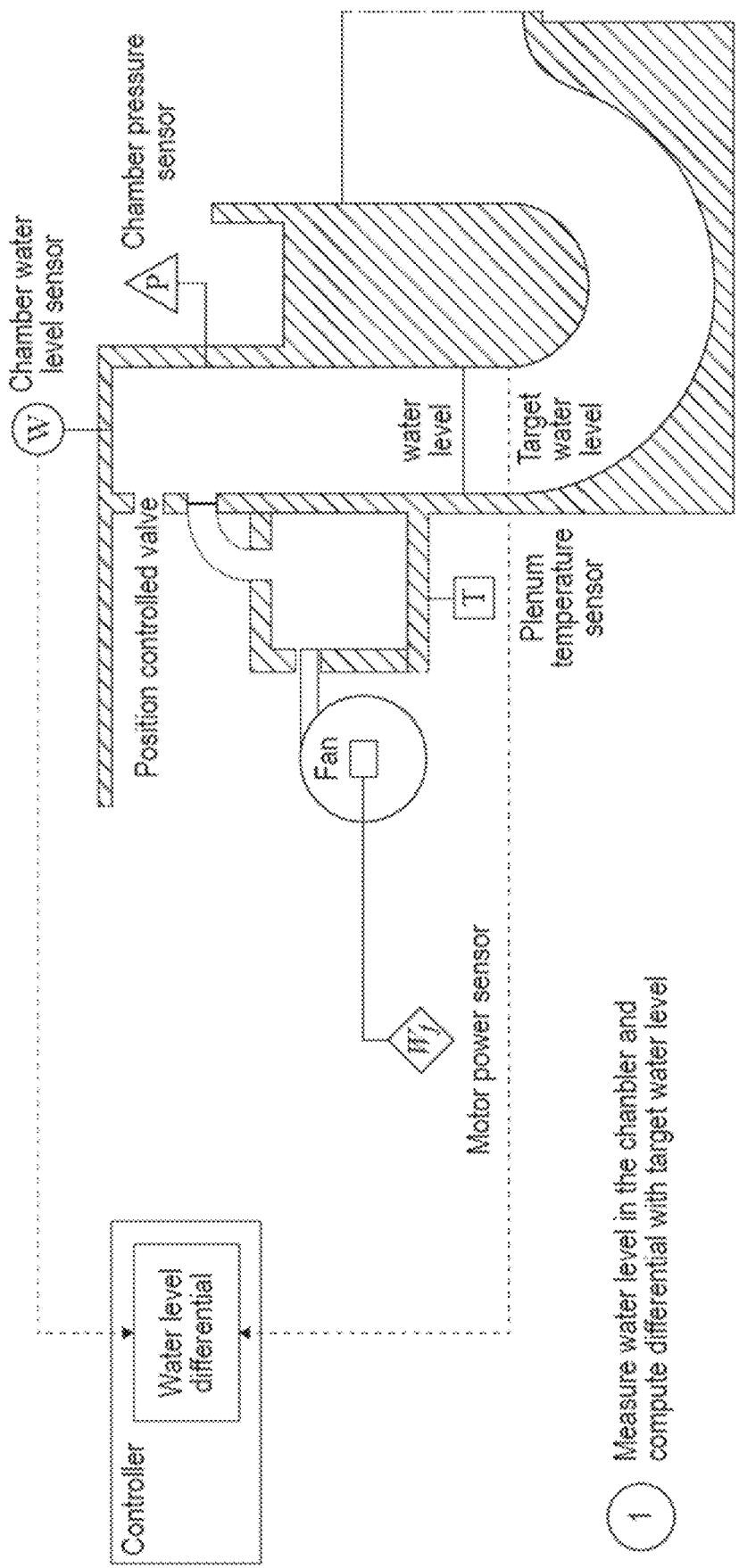
FIGS. 9A-9D illustrate aspects of the valves and water levels of the system and method corresponding to FIG. 8.
Figure 9B:
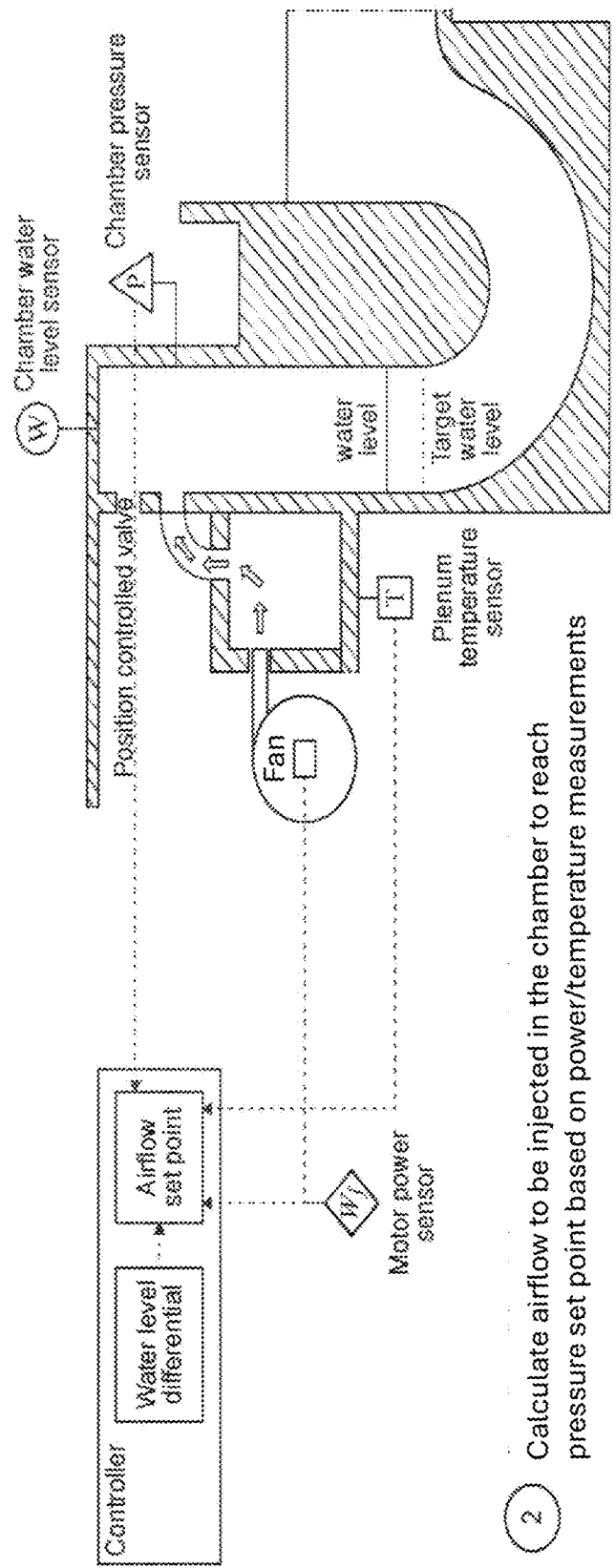
Figure 9C:
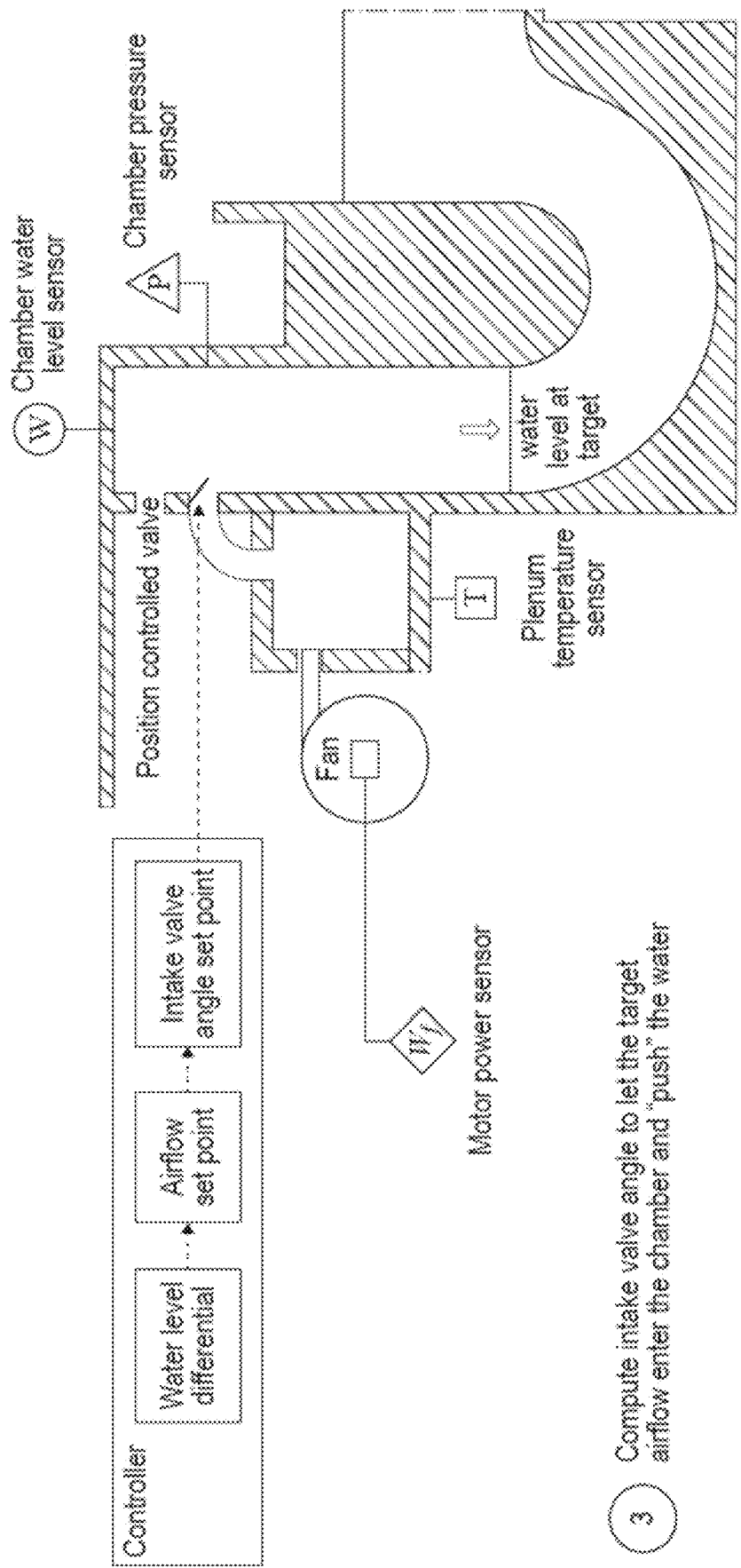
Figure 9D:
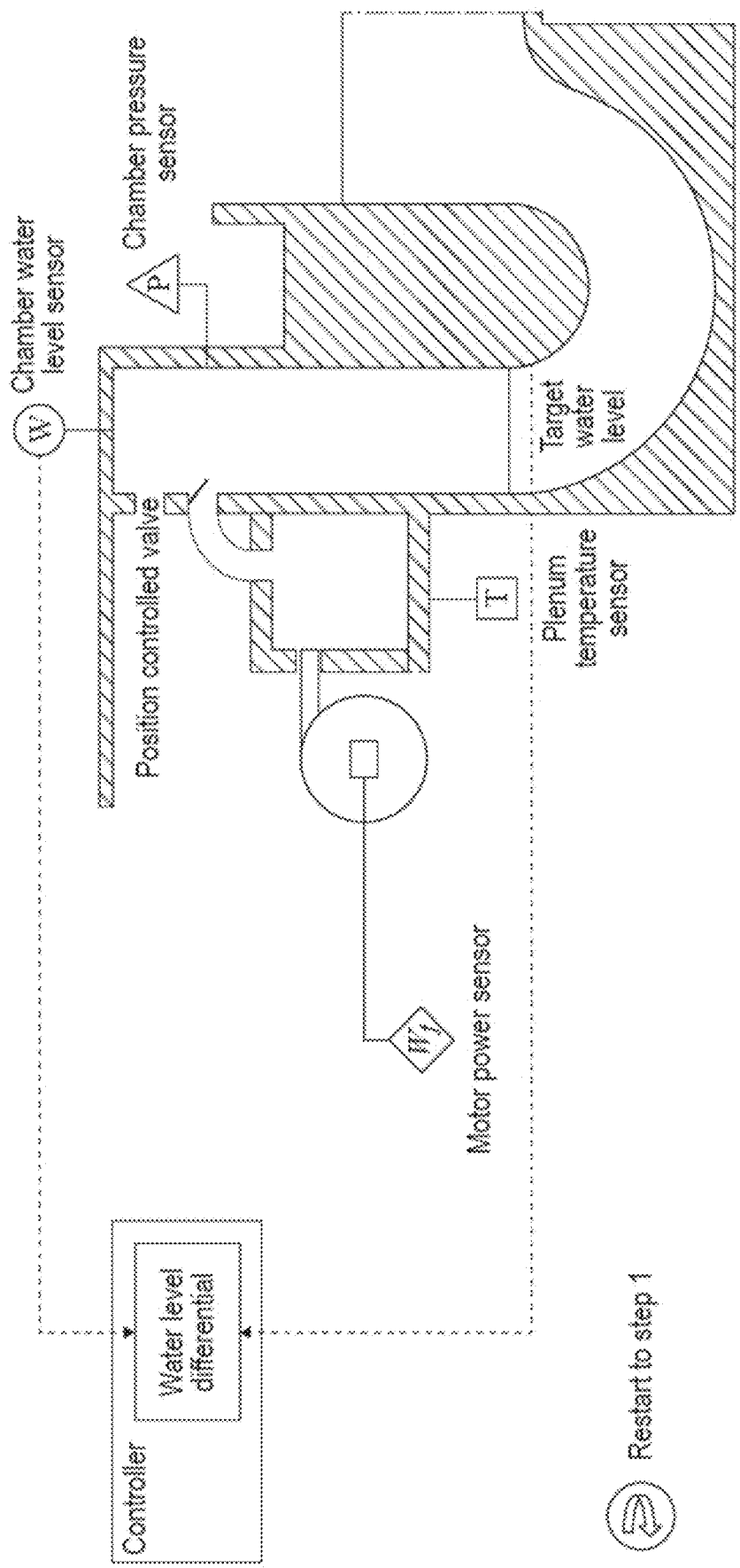

FIG. 8 is a block diagram that describes the calculation of the angle of the valve required to meet the target water height. The controller method to calculate the valve opening based on water height target and measure of current water height in the chamber, pressure in the chambers, temperature in the plenum, power drawn by the fan motors, and the temperature and humidity of the mechanical room, using well-known laws of fluid dynamics is shown. $Z^{set}$ is the target height received from the user interface. $Z_w$ is the actual water height measured by the sensors. Error is indicated by $e_{in}$, which is the difference between $Z^{set}$ and $Z_w$. The error will calculate an angle needed to reach the target, and then sends a signal to the actuator to open the valves to the appropriate degree. The process repeats as the system constantly measures, recalculates, and makes adjustments as necessary.

FIGS. 9A-9D illustrate the position of the valves and water level of the system and method at each of the points, 1, 2, and 3, indicated in FIG. 8. At the end of step 3, the system repeats, as described above. Although certain sensors are shown and described in these drawings, additional or alternative sensors may be used, as described above.

Figure 10:
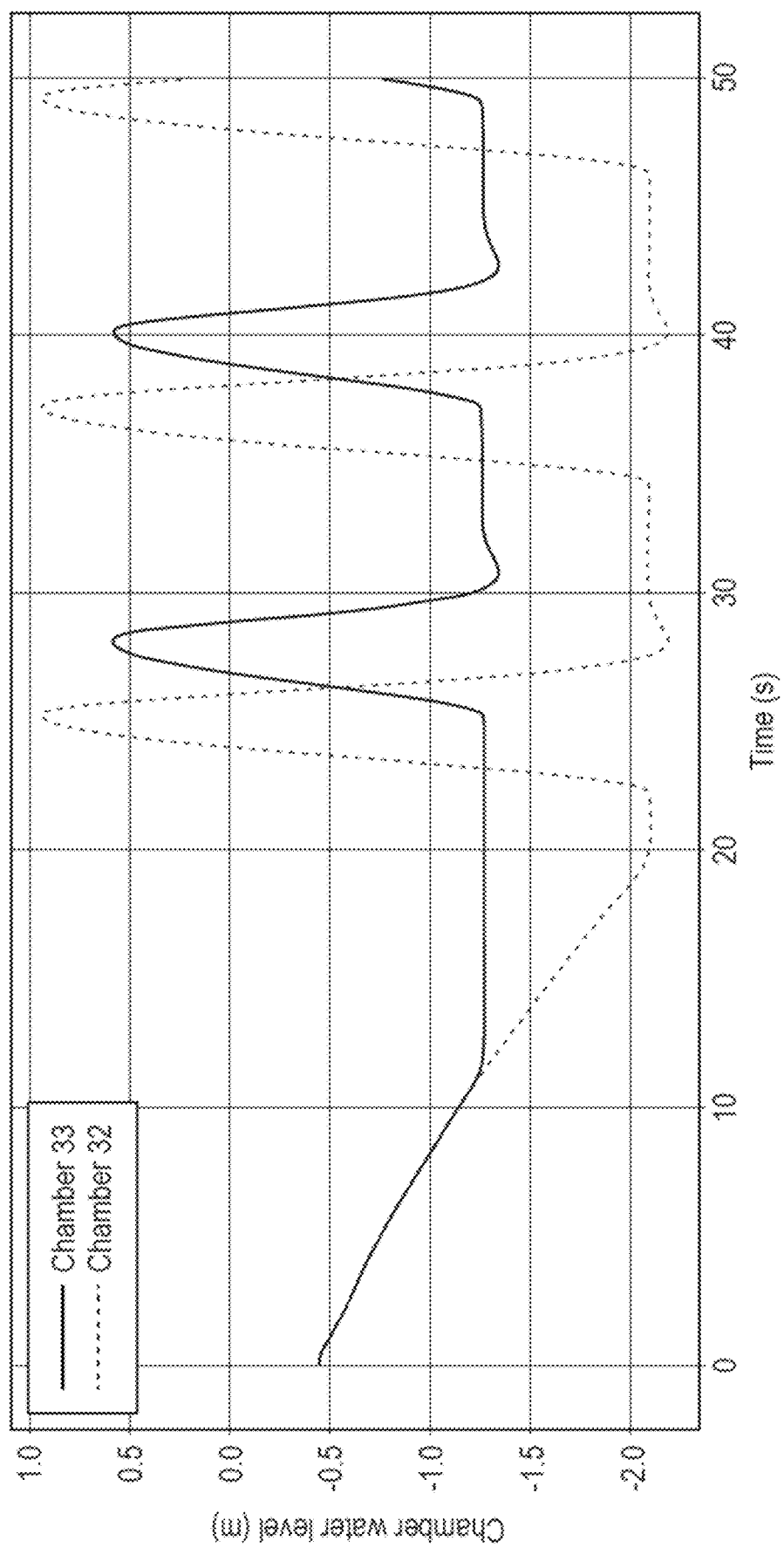
FIG. 10 is a chart representing water height evolution in different chambers.

FIG. 10 illustrates the water height evolution in different chambers. As described above, the pool wave generator and pool may be configured to produce two waves in the same pool. For example, one wave moving generally toward the left side of the pool, while a second wave moves generally toward the right side of the pool. The invention allows the ability to have different water height targets in the chambers allowing the chambers to create different size waves at the same time. For example, a more skilled rider might desire a larger wave, while a novice rider in the same pool may desire a smaller wave. FIG. 10 depicts this scenario, whereby the first wave generates a larger amplitude, and the second wave is comparatively smaller. This allows the pool to host different skill level groups at the same time and to reduce the peak power consumption.

Figure 11:
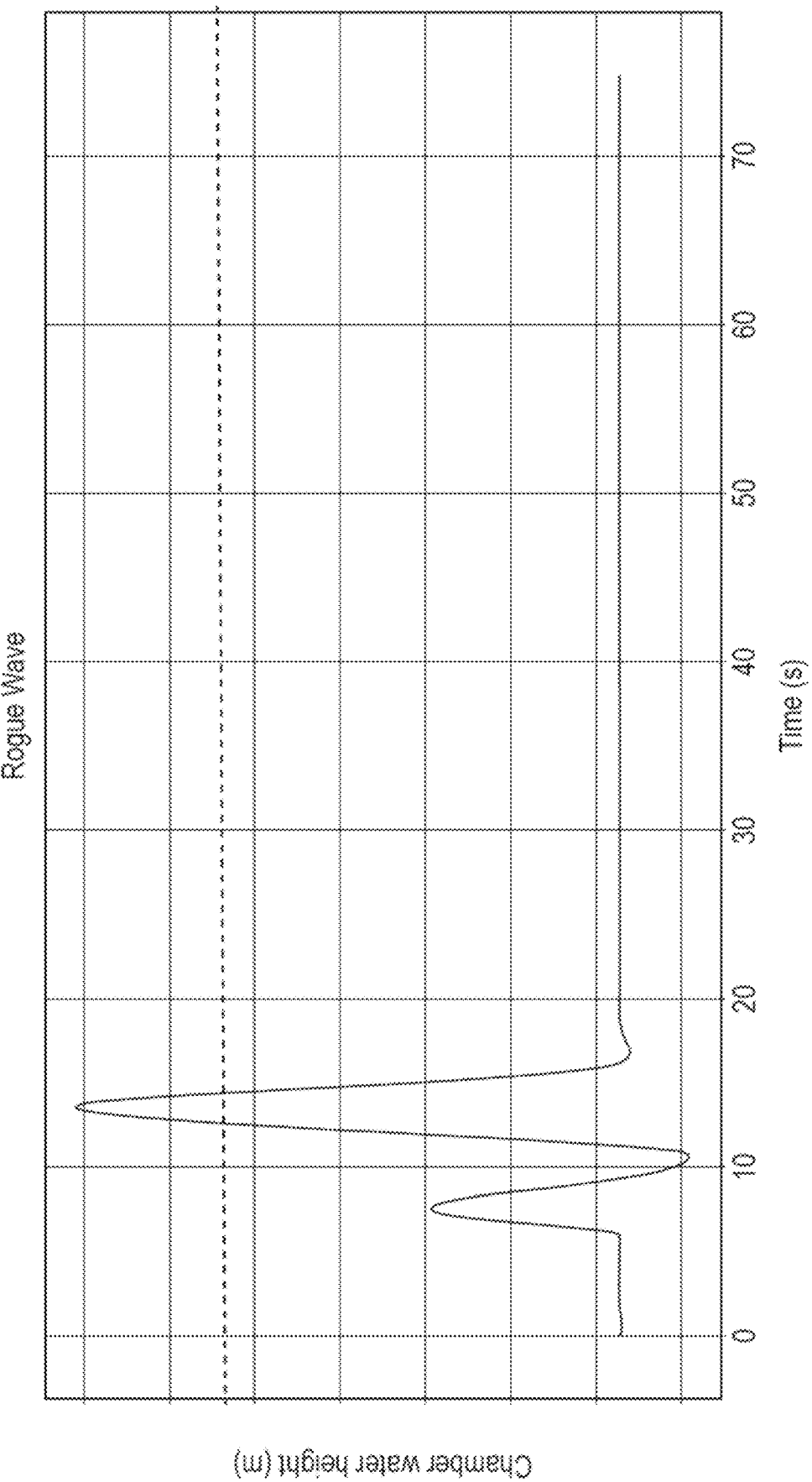
FIG. 11 is a chart representing water height in a method of exceeding the normal maximum wave amplitude.

FIG. 11 illustrates a method of creating a wave with a maximum amplitude that is greater than normally possible with a given equipment setup. In this method, the water height elevation in the chamber is controlled, allowing the system to create a first, small amplitude wave (excitation) to set the water in motion to create a bigger wave after. As shown in FIG. 11, the dashed line indicates the maximum wave amplitude for a given system. The biggest wave height can be boosted by 25% compared to the uncontrolled method, resulting in a wave that exceeds the normal maximum amplitude. As also described above, when the valves are used in this configuration, such that the valves are configured to transition between fully closed and fully open states, the air within the chamber can act as a spring. As the water within the chamber reaches a maximum or minimum height, the water level may bounce as the air is compressed and released, creating an oscillating wave surface.

In another aspect of the invention, fan surge avoidance is improved. In most of the pneumatic systems intended for wave generation, a set of air fans blows in a common plenum to build up the air pressure. But when the pressure in the plenum becomes too high for the fan to blow in, the air starts to escape from the plenum through the fan in the opposite direction. As a result, one or several fans blows backwards, making the system less efficient due to venting air. This phenomenon not only creates instabilities due to oscillation (large pressure fluctuations in the plenum) but it can also cause damage to the fan wheels, motors and bearings because the forces applied to the rotor are cyclically reversed. Vibration, overheating, and cyclical loading—alternating back and forth between forward and back flow—are typical causes of damage. These instabilities can occur not only when trying to maintain a target pressure in the plenum, but also when ramping up or when the fans are turned off and allowed to freewheel.

In another aspect of the invention, fan efficiency drop is improved. A fan curve, such as that shown in FIGS. 12A and 12B, can provide the relationship between the power consumed by the fan and the air flow/pressure it creates at the outlet. When the fan is operating in surge, efficiency can drop to zero or even negative efficiency, as air is flowing back in the opposite direction while some power is still drawn by the motor. For the whole pneumatic system, this means that the efficiency is generally lower, as the other fans in operation must blow more air to reach a given pressure in the plenum, thereby consuming more power. As efficiency of each fan cannot be controlled individually, the system finds a state of equilibrium between some fans running in surge and others in normal operation.

The fan curves are parabolic. Each fan has a maximum pressure at which the fan can still deliver air flow. When the fan reaches or exceeds the maximum, it will begin to bleed flow, which causes oscillation between forward and reverse flow—phenomena sometimes called surge (reverse flow) or stall (flow is blocked or only slightly reversed). Fan surge and stall has deleterious effects on fan efficiency and longevity.

Comparing fan efficiency to pressure shows that peak efficiency occurs close to maximum pressure. That is, the closer the system is to maximum pressure, the bigger the wave produced, and the greater the efficiency of the system in terms of mechanical power used.

Figure 12A:
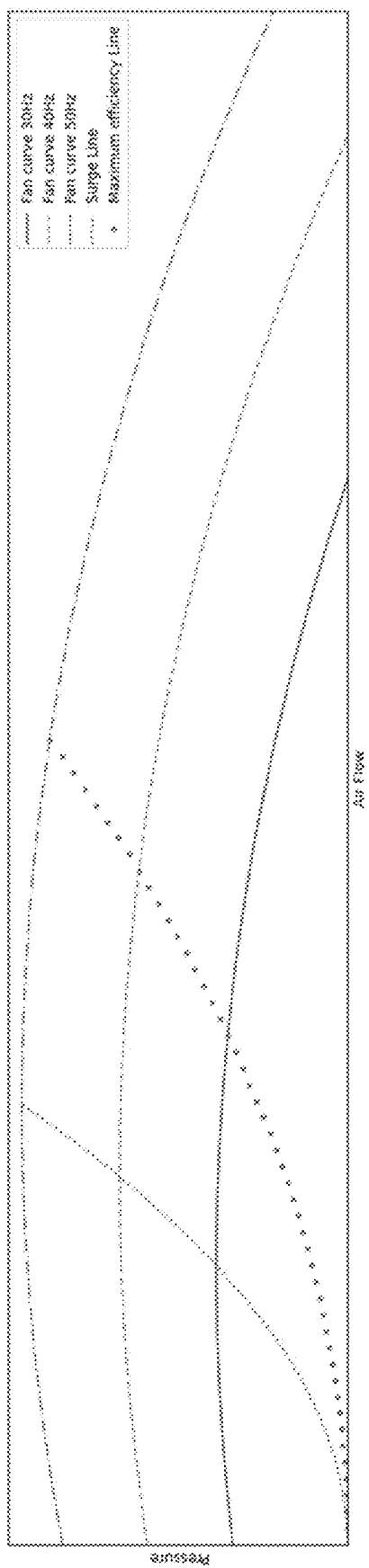
FIGS. 12A and 12B are typical fan curves showing volume flow at different fan speeds according to an aspect of the invention.

Flow output by the fan is related to pressure downstream. Pressure is related to flow, and power is related to flow, while efficiency is related to flow, pressure and power. By knowing one of these values, the other values can also be determined. Perhaps most useful is that by looking at power, it is possible to determine which particular fan(s) are in surge—something that cannot be done by measuring pressure. Once the power is known, the operator can target a power value close to max efficiency and also safely away from the surge line. Referring to FIG. 12A, which shows flow v. pressure, the top of each curve is relatively flat, which makes it difficult to determine based on pressure readings where the surge point (max pressure) really occurs. For example, near the surge limit, the curve is considerably flat, which requires a large change in air flow (i.e., moving far away from the surge line) to discern a difference in pressure due to the flatness of the pressure curve. In order to efficiently avoid surge, one will have to be far away from the surge point, which requires a large change in flow with a commensurate large consumption of power. Additionally, operation close to the surge limit is difficult because even a slight change of pressure may result in surge, making it difficult to utilize the maximum pressure from the fans and consume less power.

Figure 12B:
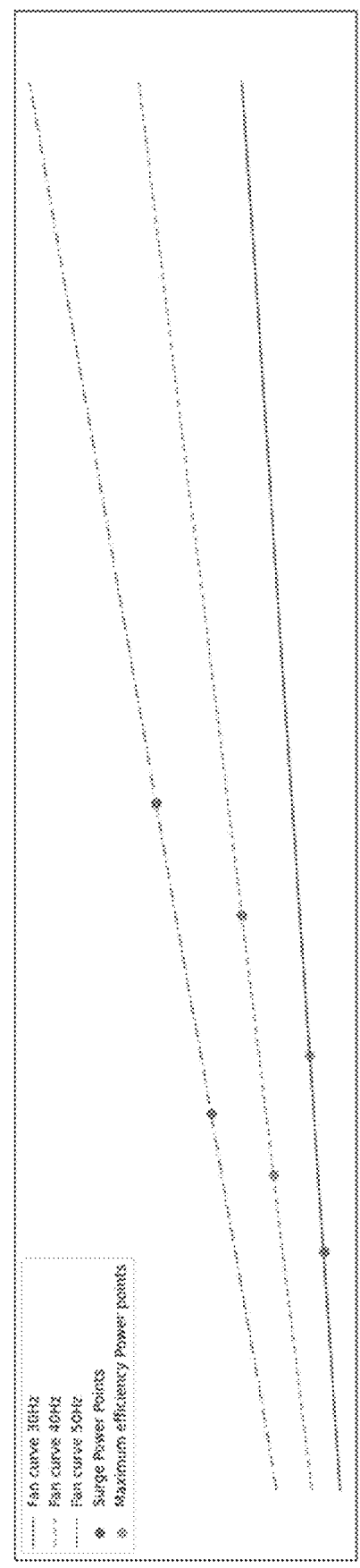

By contrast, the curve shown in FIG. 12B demonstrates a markedly different curve shape (a first order polynomial) than in FIG. 12A (a second order polynomial curve), which demonstrates the advantage of measuring power instead of pressure. By using the power curve in FIG. 12B, it is much easier to discern where the operating point of the fan is compared to the surge line. As seen, the surge limit and maximum efficiency points occur at the same point on the air flow axis (compared to FIG. 12A) for each curve. In this instance, when operating near the surge limit even a small pressure change will manifest in a large power change apparent in the power curve. Thus, the operator is able to exert finer control over the system as the range is much larger. Moreover, because FIG. 12A represents a steady state of pressure vs flow the fan may not exactly follow the curve dynamically, meaning that the operating point may not be on the curve temporarily. However the power will exactly follow the output flowrate of the curve, giving a much more robust method to deal with the dynamic behavior of the fans.

Additionally, pressure sensors are not needed because the pressure can already be determined by monitoring power output. By looking at the power of the motors, it is possible to know how far each fan is from maximum efficiency. Using this, the system can determine how much air to bleed out, and the opening angle of the exhaust valves is determined. In addition to the advantages described above, by eliminating or reducing the number of pressure sensors in each system, the operator can achieve greater cost savings, both in initial outlay and in maintenance of the system. There are also fewer breakdown points as pressure sensors are eliminated or reduced.

In another aspect of the invention, energy loss and fan damage between wave sets and large wave intervals is improved. Commonly, waves are generated in a wave pool in groups or "series," as in the ocean. It is sometimes necessary to take a break between these series to let the surfers rest or come back to the peak. Another option is increasing the interval between waves, such as when dealing with small surfing crowds. In either scenario, there are two options at the pneumatic level: (1) one can turn off the fans during the break and then turn them back on, which could cause early damage if done too often and improperly; and (2) leave the fans on during operation, which will then find a balance between some running in surge and others normal. Both scenarios may result in premature damage to the fans, which can be accompanied by the surge or stall phenomenon described above.

Prior attempts to address these issues make use of a vent valve on the plenum that opens for a fixed duration when the pressure recorded by a pressure sensor in the plenum exceed a threshold. Similar solutions exist in compressor engineering called surge control method (vent or blow off valve with pressure sensors, or recycle valve where the outlet gas is directed to the inlet not to the waste gas).

Although this existing solution is a first answer to avoid fan reverse flow, the problem can be solved even more precisely. Indeed, it is a passive fan control solution: the vent valve is programmed to open for a preset duration when the pressure in the plenum exceeds a threshold value, meaning no active control.

This solution often results in undesirable results, such as: (1) potentially evacuating too much air or not enough since this process does not take into account the actual operating state of the fan; (2) inability to maintain a steady pressure in the plenum because the binary control of the valve (fully open or fully closed) makes the control system unstable; (3) inability to monitor the fan operating point in real time (not working at maximum efficiency); (4) blowing unnecessary amount of air, thereby expending unnecessary energy; (5) requiring extra vent valves on the plenum; and less uniform control along the plenum, resulting in unwanted pressure waves. An additional benefit is that power consumption is easily measurable with reference to each particular fan, whereas pressure measurements are typically taken with reference to an entire plenum. By measuring power consumption of each fan, an operator can ascertain which particular fan(s) is in surge (or is near surge) and can make adjustments to that fan alone. Because the power when in surge will be close to zero, or at least noticeably low, when a fan is detected to be in surge there are several options to remove the fan from surge. For example, decreasing the pressure in front of the fan to a certain level or speeding up the fan to get it out of surge and then ramp it down to the initial speed. This benefit is not available when measuring pressure alone. Inlet vane control (IVC) dampers are also commonly installed in centrifugal fan inlets to provide regulation and control. Its multiple blade arrangement around a central hub helps to introduce swirl into the fans inlet for an enhanced flow control. With any form of actuation, it can also be designed to fulfil the same purpose as a variable frequency drive (VFD) that modulates the motor speed to achieve different pressure levels in the plenum, thereby changing characteristics of the fan curve.

The IVC damper with blades can present their own problems. Because it is a more sophisticated vane it also means that they are more expensive, more fragile, and are often used in static and less with control systems. On the other hand, knowing that this inlet valve will be used during breaks between sets or long wave intervals, and that we already have a VFD to control the pressure in the plenum, a IVC with blades might be too elaborate and/or expensive for some applications.

In one aspect, the invention can be divided into two components: a controller that controls the fans inlet opening, and a monitor that independently controls the exhaust valve of each pneumatic chambers.

In this aspect, the invention uses the exhaust valves of each chamber instead of adding vent valves to control the fans performance. By measuring the power consumed by the fans in real time, it is possible to determine the amount of air to be evacuated from the pneumatic system (and thus an opening angle of the exhaust valves) so that the fans operate at maximum efficiency. It also allows correct regulation of the fan airflow to avoid instabilities. By using the exhaust valves of the chambers, the operator can achieve a much more responsive system with uniform venting because there are multiple exhaust valves, compared to current systems which typically use one vent valve per fan. That is, it is possible to vent all along the plenum, rather than at just one point.

Additionally, a valve mounted on the fan inlet allows the incoming air flow to be controlled. In this way, it is possible to keep the motors rotating at a given speed with little or no energy consumption when the valve is partially or fully closed. This feature is very useful when there is no need to generate waves for a moment that does not justify turning off the fans.

Figure 13:
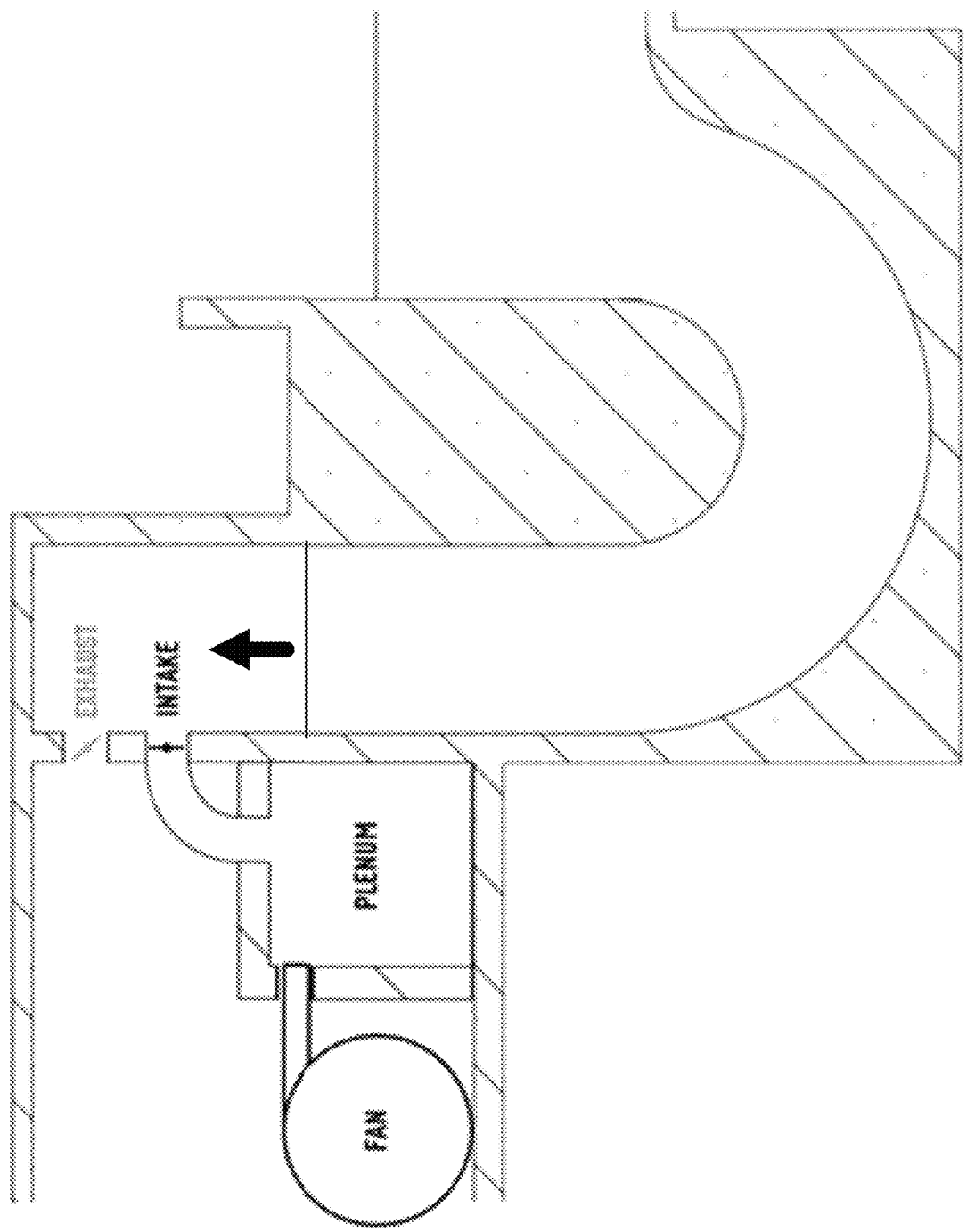
FIG. 13 illustrates an exemplary wave-generating chamber according to embodiments of the invention.

Each vent valve has a dual purpose: venting the chamber to create the wave and venting the chamber to regulate the fans. These two functions are not done at the same time. With respect to the exhaust valve controller, the fans blow in a common plenum which feeds independent wave generation caissons through their intake butterfly valve. Also, each chamber is equipped with an exhaust valve to evacuate the air from the chamber, which also removes air from the plenum, which causes the water to rise in the chamber under gravity to setup the next wave generation cycle, as depicted in FIG. 13. This second function works only if both valves (exhaust and intake) are open.

Figure 14:
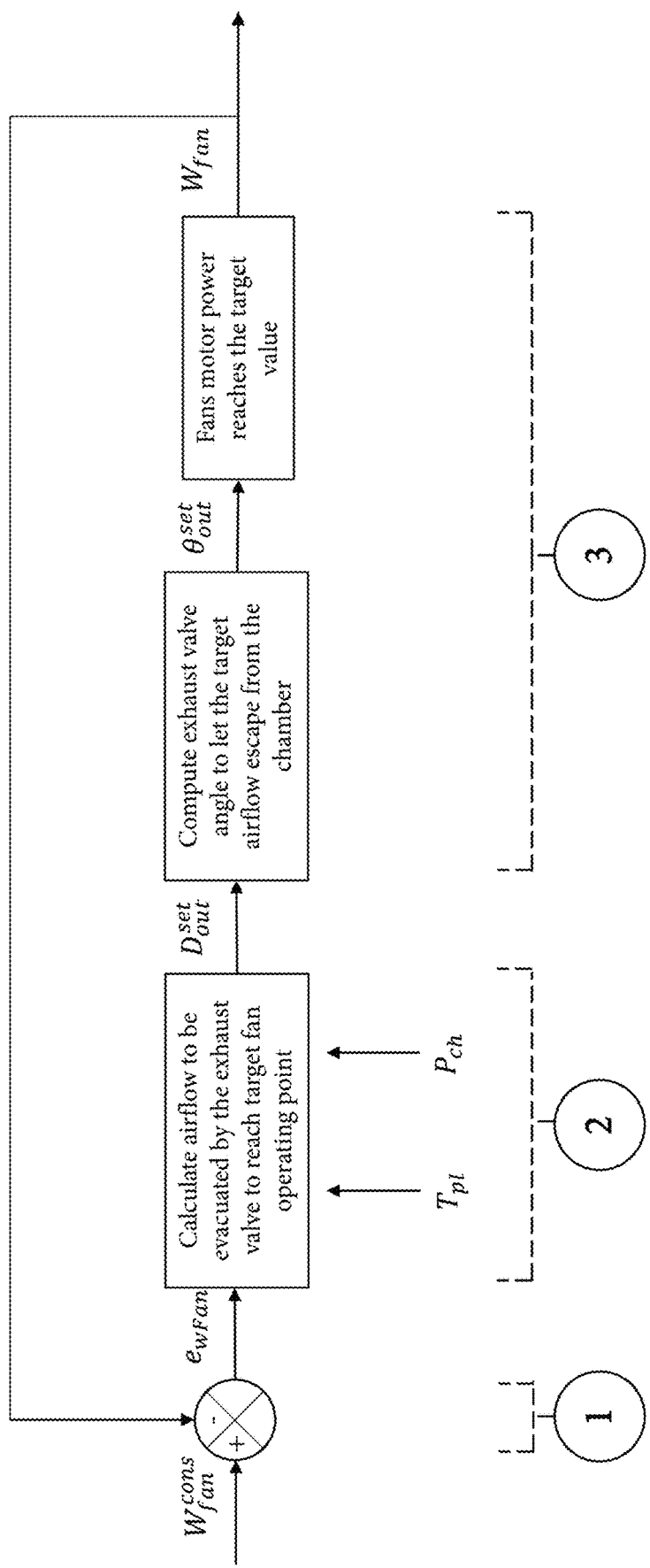
FIG. 14 is a block diagram describing the calculation of exhaust valve angle according to an aspect of the invention.

A power sensor (variable frequency drive or VFD) measures in real time the power drawn by each fan, while two other sets of sensors measure temperature in the plenum and pressure in the chambers. For a given fan rotating speed and a given air density (calculated with a temperature and humidity sensor located in the mechanical room) the fan curve gives the relationship between the power consumed and the air flow at the fan outlet. Then, the exhaust controller calculates the airflow to be evacuated from the plenum to reach the target fan operating point (to maximize efficiency), as depicted in FIG. 14. Next, the controller computes an exhaust valve angle to let the target airflow escape from the chamber. Finally the fans motor power reaches the target value. In some embodiments, additional sensors (temperature, inlet air flow, fan room humidity, etc.) can be employed to give more accurate results.

As the chamber intake valve is also fitted with a controller, the two controllers form a coupled system. When the exhaust valve opens to remove air from the chamber, the intake valve opens immediately to compensate for the loss of air in the chamber following a second independent controller targeting a specific water level target and to remove excess air from the plenum. As a result, the fans are indirectly regulated by the exhaust controller to work at the target operating point, ensuring a stable maximized efficiency.

Figure 15A:
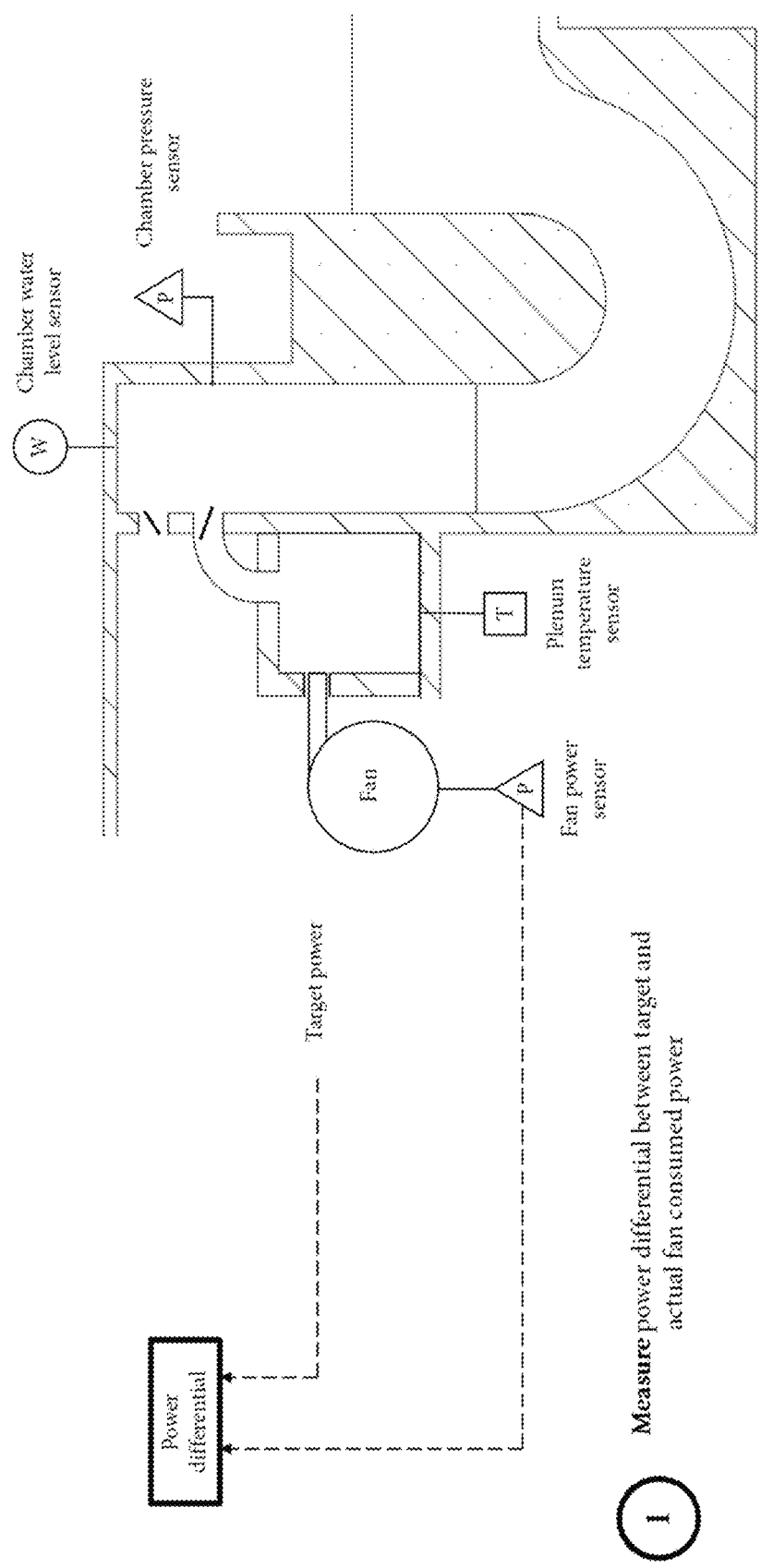
FIGS. 15A through 15E illustrate aspects of the valve angle calculation according to an aspect of the invention.
Figure 15B:
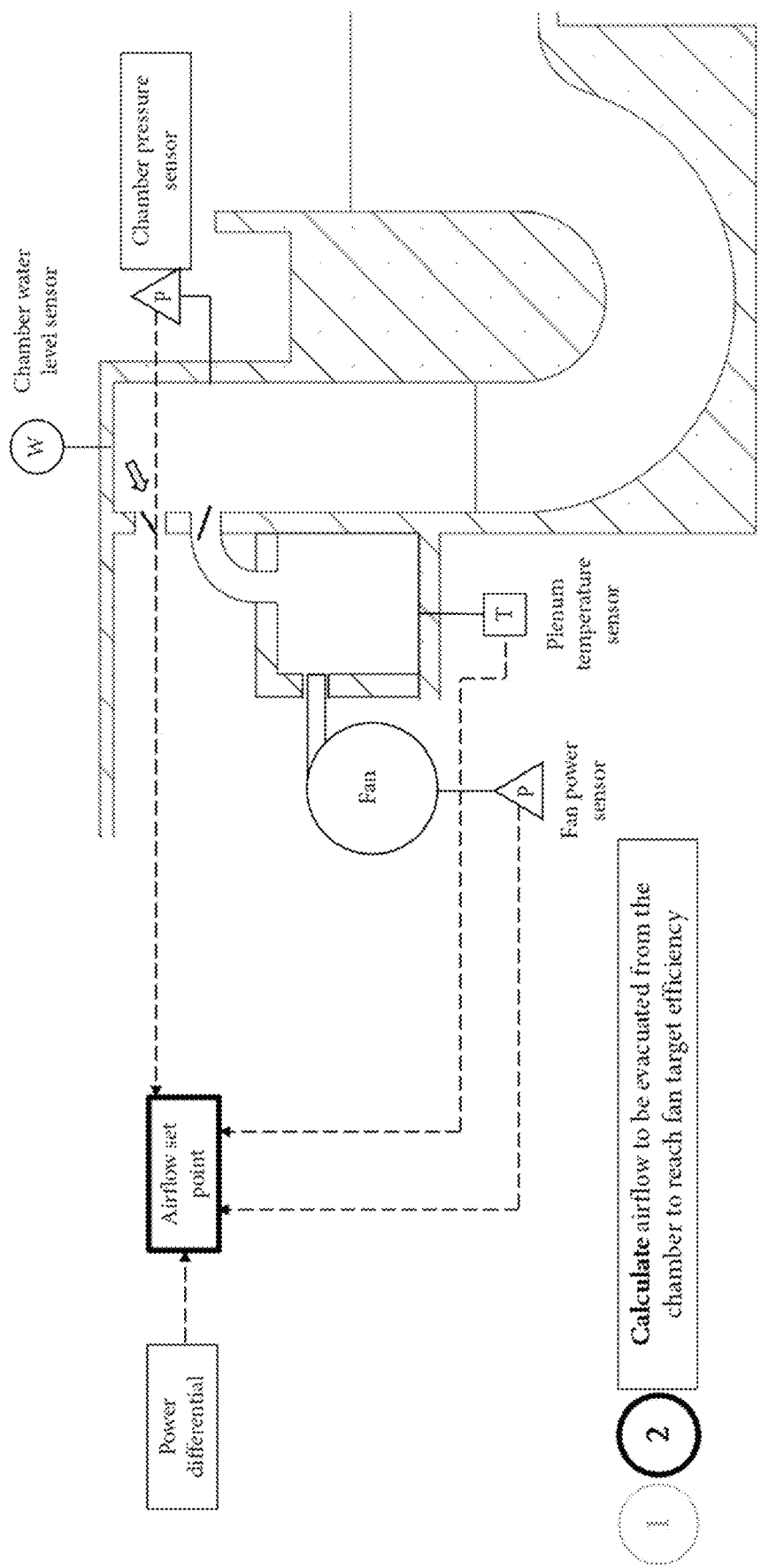
Figure 15C:
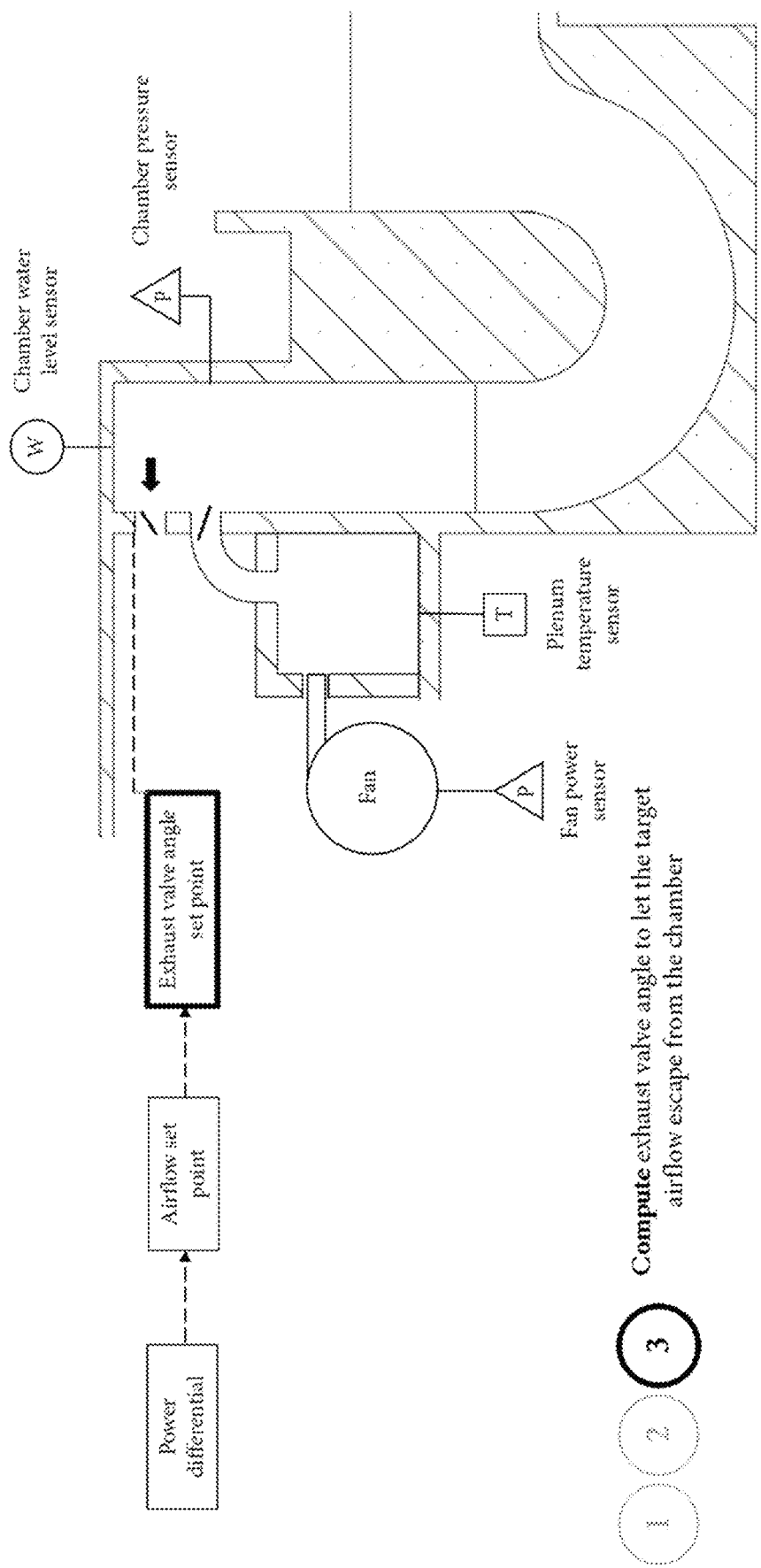
Figure 15D:
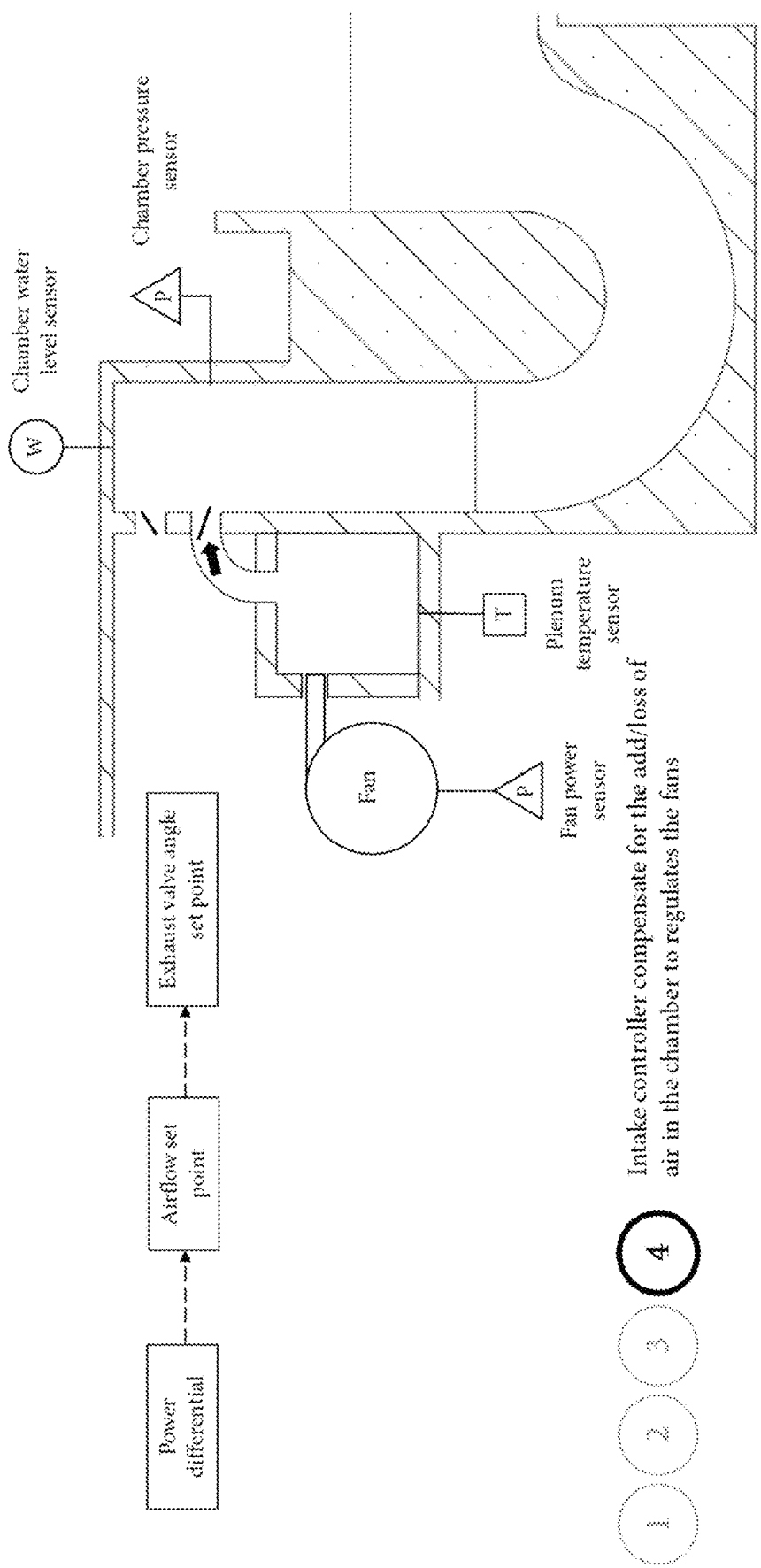
Figure 15E:
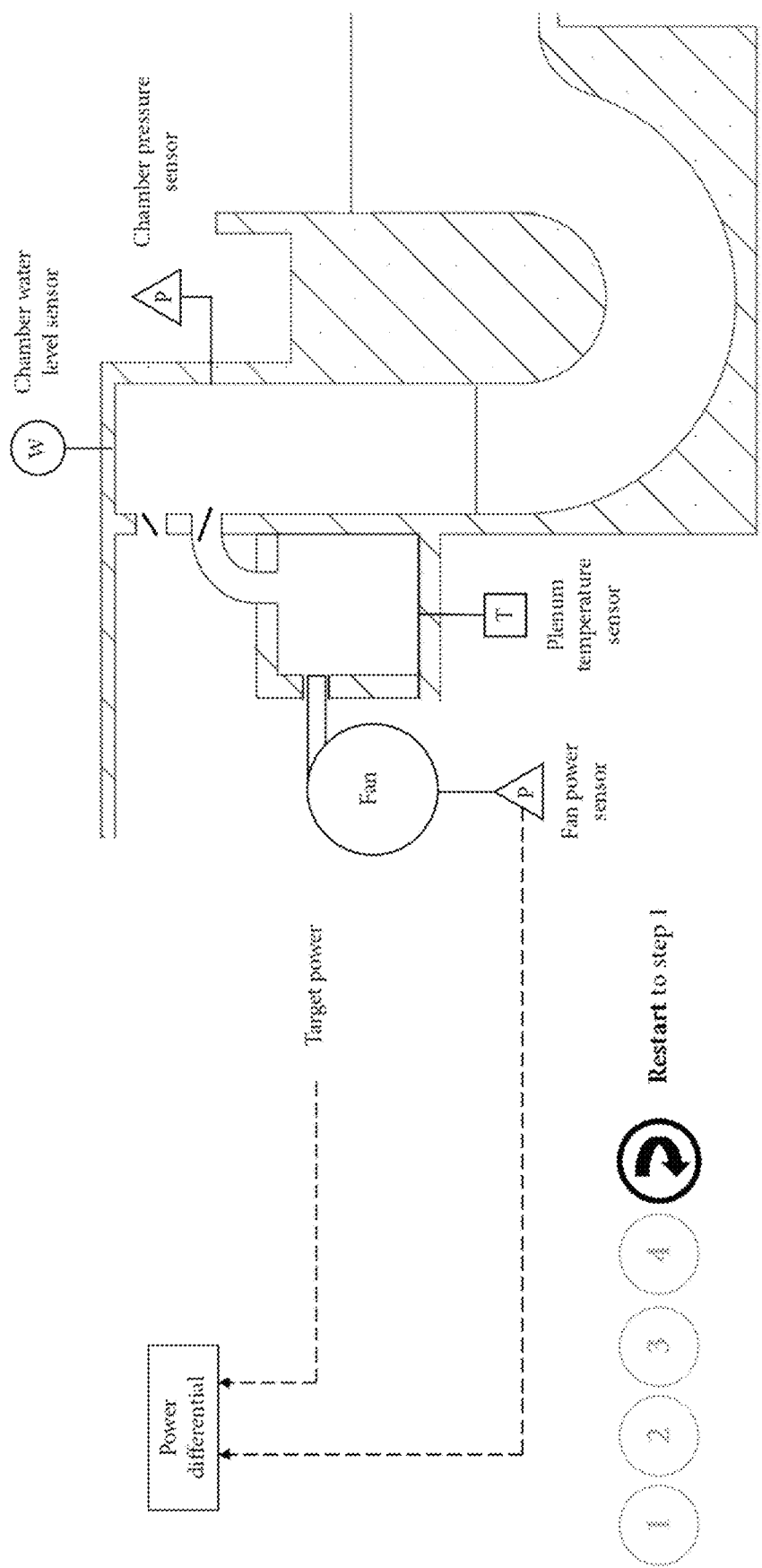

FIGS. 15A through 15E illustrate the process. FIG. 15A depicts the steps and diagrams the wave generator in step 1. First, the controller measures the power differential between the target and actual fan consumed power. In step 2, shown in FIG. 15B, the system calculates the airflow to be evacuated from the chamber to reach target fan efficiency. In step 3, shown in FIG. 15C, the system computes the exhaust valve angle to let the target airflow escape from the chamber. In step 4, shown in FIG. 15D, the intake controller compensates for the addition or loss of air in the chamber to regulate the fans. Finally, the process is restarted, as shown in FIG. 15E. For purposes of these illustrations, the intake and exhaust valves are each shown in a partially open state. The valves are capable of being positioned at other angles, as appropriate depending on the requirements of the system and the step of the cycle in which the system is operating.

The exhaust valve controller of this aspect of the invention presents various advantages over prior systems. The system prescribes no preset variables regarding pressure threshold and the corresponding time the valves are to be kept open, meaning that the system has active control, reacting intelligently according to the measurements of each sensor. Additionally the system requires no plenum pressure sensors because it monitors fan power and not plenum pressure. It also allows inlet valve control. And because the target aspect is efficiency and not pressure, it tends to result in greater efficiency in the system. In some embodiments, the increased fan set efficiency may be +25% or more compared to a system using no controller. The system can be coupled in system with chamber intake, exhaust and fan inlet valves, and does not require extra vent valves.

The benefits to the fan is that it avoids fan instabilities, and increases fan longevity by removing the loads for which the fans were not designed. Fans can safely freewheel when no waves are generated. The system can deliver bigger and more consistent waves due to elimination or reduction of airflow oscillations. Noise and heat generation by the fans are also reduced. The fan performance can therefore be fully exploited during the wave generation process at the top of the curve. The system also correctly feeds the pneumatic caissons with a stable airflow.

Because prior systems focused on vent valves connected to blowers, the system might have a relatively small amount of exhaust valve, resulting in relatively less control over the system. In one aspect of the invention, the wave generator might be comprised of multiple chambers, with each chamber have 2 or more exhaust valves. For example, a system with 48 chambers might have 2 exhaust valves per chamber, resulting in 96 exhaust valves, and a greater degree of control over where, when, and how much to vent each chamber. The distributed exhaust valves can be opened to blow air out quickly when needed. And, because the exhaust valves in this aspect are distributed more uniformly than in prior systems, the user will have more precise control over venting.

With respect to the fan inlet valve controller, the inlet valve is mounted on the air inlet of the fan and allows control over incoming flow. The more the valve closes, the less air enters and therefore reduces the power drawn by the fan. It allows the system to leave the motors on, the wheel in rotation, so the motor consumes less power at fixed speed. It is then possible to control this valve so that it closes progressively when waves are not/less needed in the wave pool at a given moment. Finally, the inlet valve reopens little by little to let the air in and compress it again. This way, one can limit the energy consumption of the engines when there is no wave in the wave pool. By placing a position-controlled butterfly valve capable of various angles of opening in front of the fan, the system functions more efficiently than with prior inlet valves.

Figure 16:
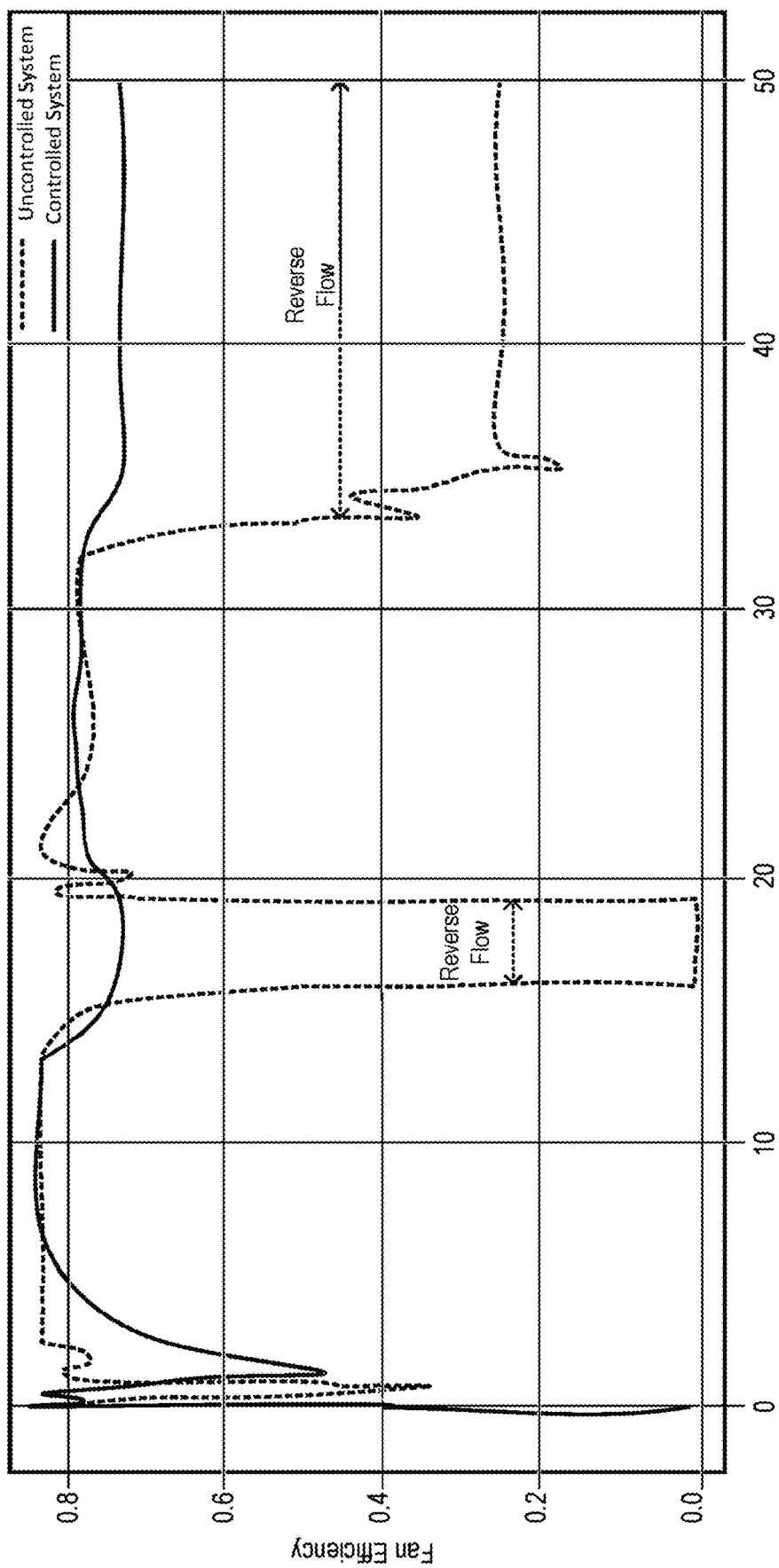
FIG. 16 is a fan efficiency curve showing a comparison of an uncontrolled system and a controlled system according to an aspect of the invention.

The system described here provides information relating to the efficiency of the fans during operation. FIG. 16 shows a fan efficiency curve for the uncontrolled and controlled system during the generation of one wave. The curve demonstrates that the phenomenon of the fans decreasing in efficiency when they enter in reverse flow is completely avoided by activating the exhaust controller.

Benefits to fan the inlet valve (not shown) include reduced power consumption, improved fan speed ramp up, and reduced fan noise. The fan speed can be ramped up individually at different times which decreases the peak power consumption. For example, each fan may be ramped up a certain time period (0.5 s, 1 s, 2 s, e.g.) after the preceding fan was ramped up. The offset time between ramp-up of each fan may be the same for each successive fan, or it may vary according to the particular operating needs of the system. An additional advantage of the offset ramp-up times is that the system will experience a lower peak power level as compared to all of the fans being ramped up at the same time.

Although the exhaust valve and inlet valve controller descriptions herein are directed to use with a wave generator, it will be appreciated that the principles disclosed herein may be advantageously applied to other applications that employ fans and plenum systems.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. Specifically, exemplary components are described herein. Any combination of these components may be used in any combination. For example, any component, feature, step or part may be integrated, separated, sub-divided, removed, duplicated, added, or used in any combination and remain within the scope of the present disclosure. Embodiments are exemplary only, and provide an illustrative combination of features, but are not limited thereto.

When used in this specification and claims, the terms "comprises" and "comprising" and variations thereof mean that the specified features, steps or integers are included. The terms are not to be interpreted to exclude the presence of other features, steps or components. Likewise, the words "and" and "or" should not be interpreted to exclude the presence of other features, steps or components, unless otherwise specified.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A pool wave generator, comprising:
   a pool area;
   at least one chamber on one side of the pool area for releasing water into the pool area to generate a wave in the pool area;
   a plenum in fluid communication with the at least one chamber;
   at least one fan positioned in fluid communication with the plenum;

a valve controller;

an intake valve positioned between the plenum and the chamber capable of being selectively opened by a position-controlled actuator at different angles to allow air to enter the chamber from the plenum at a controlled rate;

an exhaust valve capable of being selectively opened at different angles, and positioned at a wall of the chamber such that air can be vented out of the chamber through the exhaust valve, wherein the position of the exhaust valve is independent of the position of the intake valve;

a first and second sensor in communication with the valve controller;

wherein the first sensor monitors fan power consumption and the second sensor monitors water level in the chamber, the first and second sensor operating independently of each other; and wherein the degree to which the exhaust valve is opened is determined by the valve controller based on power consumption information for the at least one fan.

2. The pool wave generator of claim 1 in which the intake valve is a butterfly valve.

3. The pool wave generator of claim 1 in which the exhaust valve is a butterfly valve.

4. The pool wave generator of claim 1, wherein in a first mode the exhaust valve operates to vent air from the chamber to push water into the pool area to generate a wave in the pool area, and in a second mode the exhaust valve vents air from the plenum and chamber to regulate fan operation.

5. The pool wave generator of claim 1, wherein the valve controller adjusts the opening angle of the exhaust valve in response to power consumption information received from the first sensor.

6. A method for generating waves in a wave pool comprising:

providing a pool area, at least one chamber for releasing water into the pool area to generate a wave in the pool area, a plenum in fluid communication with the at least one chamber, at least one fan positioned in fluid communication with the plenum, a valve controller, an intake valve positioned between the plenum and the chamber, and an exhaust positioned at a wall of the chamber such that air can be vented out of the chamber through the exhaust valve, and a first and second sensor in communication with the valve controller;

determining a target power consumption of the at least one fan;

monitoring the actual power consumption of the at least one fan with the first sensor;

determining the differential between the target power consumption and the actual power consumption of the at least one fan;

calculating the air flow to be vented from the chamber to reach the target power consumption level;

calculating an exhaust valve opening angle that will provide the calculated air flow to the at least one fan;

adjusting the intake valve to compensate for the change in air in the chamber following a second controller targeting a specific water level target.

7. The method of claim 6 wherein the target power consumption is determined based on the actual air density in the chamber as determined by a temperature sensor and a humidity sensor located in the mechanical room.

\* \* \* \* \*